United States Patent
Sternklar et al.

(10) Patent No.: US 11,333,484 B2
(45) Date of Patent: May 17, 2022

(54) METHOD AND SYSTEM FOR INTERFEROMETRY

(71) Applicant: Ariel Scientific Innovations Ltd., Ariel (IL)

(72) Inventors: Shmuel Sternklar, Yakir (IL); Moshe Ben-Ayun, Shoham (IL); Egor Liokumovitch, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 17/046,781

(22) PCT Filed: Apr. 18, 2019

(86) PCT No.: PCT/IL2019/050450
§ 371 (c)(1),
(2) Date: Oct. 11, 2020

(87) PCT Pub. No.: WO2019/202602
PCT Pub. Date: Oct. 24, 2019

(65) Prior Publication Data
US 2021/0033380 A1  Feb. 4, 2021

Related U.S. Application Data

(60) Provisional application No. 62/659,723, filed on Apr. 19, 2018.

(51) Int. Cl.
*G01B 9/02* (2022.01)
*G01B 9/02003* (2022.01)
(Continued)

(52) U.S. Cl.
CPC ....... *G01B 9/02003* (2013.01); *G01B 9/0201* (2013.01); *G01B 9/02028* (2013.01); *G01B 9/02041* (2013.01)

(58) Field of Classification Search
CPC .............. G01B 9/02003; G01B 9/0201; G01B 9/02028; G01B 9/02041; G01J 9/02
See application file for complete search history.

(56) References Cited

U.S. PATENT DOCUMENTS

| | | |
|---|---|---|
| 5,048,964 A | 9/1991 | Tyrer et al. |
| 5,835,258 A | 11/1998 | Papuchon et al. |

(Continued)

FOREIGN PATENT DOCUMENTS

| | | |
|---|---|---|
| WO | WO 2017/060908 | 4/2017 |
| WO | WO 2019/202602 | 10/2019 |

OTHER PUBLICATIONS

International Preliminary Report on Patentability dated Oct. 29, 2020 From the International Bureau of WIPO Re. Application No. PCT/IL2019/050450. (7 Pages).

(Continued)

*Primary Examiner* — Jonathan M Hansen

(57) ABSTRACT

An interferometer system comprises a sample interferometer arm for guiding a first wave to a sample, and receiving a reflected wave from the sample and a phase amplifier for amplifying a phase shift of the reflected wave, to provide phase-shift-amplified intermediate wave. The interferometer system can also comprise an additional interferometer arm for guiding an additional wave to combine with the intermediate wave, to provide an output wave, and a detector for detecting the output wave.

18 Claims, 9 Drawing Sheets

(51) Int. Cl.
  *G01B 9/02015* (2022.01)
  *G01B 9/02001* (2022.01)

(56) References Cited

U.S. PATENT DOCUMENTS

| | | | | |
|---|---|---|---|---|
| 6,137,574 A | * | 10/2000 | Hill | G03F 7/70716 356/486 |
| 6,208,415 B1 | * | 3/2001 | De Boer | G01N 21/4795 356/450 |
| 10,790,909 B1 | * | 9/2020 | Suni | H04B 10/50 |
| 2002/0085209 A1 | | 7/2002 | Mittleman et al. | |
| 2013/0027712 A1 | * | 1/2013 | Yuan | G01B 9/02004 356/479 |
| 2014/0029012 A1 | | 1/2014 | Ogawa | |
| 2015/0015893 A1 | * | 1/2015 | Nakahira | G01N 21/88 356/495 |
| 2021/0033380 A1 | * | 2/2021 | Stern | G01J 9/02 |

OTHER PUBLICATIONS

International Search Report and the Written Opinion dated Aug. 5, 2019 From the International Searching Authority Re. Application No. PCT/IL2019/050450. (12 Pages).

Ben Ayun et al. "Fundamental Limits of Photonic RF Phase-Shift Amplificaiton by RF Interferometry", Journal of Lightwave Technology, 35(10): 1906-1913, Published Online Mar. 8, 2017.
Ben Ayun et al. "Photonic Radio Frequency Phase-Shift Amplification by Radion Frequency Interferometry", Optics Letters, 40(21): 4863-4866, Published Online Oct. 19, 2015.
Brophy "Effect of Intensity Error Correlation on the Computed Phase of Phase of Phase-Shifting Interferometry", Journal of the Optical Society of America A, 7(4): 537-541, Apr. 1990.
Chwedenczuk et al. "A Multi-Path Interferometer With Ultracold Atoms Trapped in an Optical Lattice", Physics Review A, 87: 033607-1-033607-12, Published Online Mar. 5, 2013.
D'Ariano et al. "Arbitrary Precision in Multipath Interferometry". Physical Review A, 55(3): 2267-2271, Mar. 1997.
Moslehi "Noise Power Spectra of Optical Two-Beam Interferometers Induced by the Laser Phase Noise", Journal of Lightwave Technology, LT-4(11): 1704-1710, Nov. 1986.
Ou "Fundamental Quantum Limit in Precision Phase Measurement", Physical Review A, 55(4): 2598-2609, Apr. 1997.
Petermann et al. "Semiconductor Lase Noise in an Interferometer System", IEEE Journal of Quantum Electronics, QE-17(7): 1251-1256. Jul. 1981.
Salehi et al. "Theoretical and Experimental Analysis of Influence of Phase-to-Intensity Noise Conversion in Interfeometric Systems", Journal of Lightwave Technology, 22(6): 1510-1518, Jun. 2004.
Weihs et al. "All-Fiber Three-Path Mach-Zehnder Interferometer", Optics Letters, 21(4): 302-304, Feb. 15, 1996.

\* cited by examiner

METHOD AND SYSTEM FOR INTERFEROMETRY

RELATED APPLICATIONS

This application is a National Phase of PCT Patent Application No. PCT/IL2019/050450 having International filing date of Apr. 18, 2019, which claims the benefit of priority under 35 USC § 119(e) of U.S. Provisional Patent Application No. 62/659,723 filed on April 19, 2018. The contents of the above applications are all incorporated by reference as if fully set forth herein in their entirety.

FIELD AND BACKGROUND OF THE INVENTION

The present invention, in some embodiments thereof, relates to wave interference and, more particularly, but not exclusively, to interferometry employing phase-shift amplification.

Many applications require the measurement of distance and displacement down to nanometer-scale resolution. A non-contact technology that can provide this level of resolution is optical interferometry, which is a technology that relies on the wave nature of light. Optical interferometry has been used to determine many properties of objects, such as surface textures, shapes, distances, speeds, indices of refraction and the like.

Optical interferometry is based on the phenomenon that two coherent light waves to interfere with each other constructively and destructively. A typical interferometer includes a light source that provides a beam of light followed by a beam splitter that splits the beam into two beams. The measurement beam is reflected off the object whose property is to be measured, and is then recombined with the reference beam, which does not interact with the object. The waves in the beams interfere with each other both constructively and destructively to produce an interference pattern, which is a function of the optical path difference (OPD) between the paths traveled by the two beams. The interference pattern can be analyzed to obtain information about the properties of the test object.

In a type of interferometers known as a Michelson interferometer, a partially mirrored surface that serves as a beam splitter splits a beam of monochromatic light into two beams and that are directed to travel in different directions. One split beam reflects off a flat reference mirror back to the beam splitter, while the other split beam reflects off of an object being studied and returns back to the beam splitter where the two split beams are recombined. The combined beams produce an interference pattern. The difference in the lengths of the overall paths taken by each of the split beams is encoded in the interference pattern. For example, a difference between the distance traversed by the two beams equal to one wavelength (one-half wavelength up and back) results in the recombined wave going through one bright-dark-bright cycle. A dark region is created whenever the round-trip path along one arm, or beam path, of the interferometer increases or decreases by one-quarter wavelength with respect to the other arm since the total increased distance traveled by one of the split beams both up and back is one-half the wavelength (two times one-quarter wavelength) of the monochromatic beam. Because the resolution of the Michelson interferometer is approximately one-half of the wavelength of the monochromatic light beam, optical interferometry provides very precise distance measurements.

Another type of interferometers is the Mach-Zehnder (MZ) interferometers. A Mach-Zehnder interferometer typically uses light from a coherent light source that is split into two optical beams and. One split beam is used as a reference and traverses an optical path of fixed length, and another split beam is guided along an optical path having a variable length. The beams are subsequently recombined to produce an output beam having an interference pattern. The length of the variable optical path length may be lengthened or shortened to achieve a desired relation between the two beams.

An additional type of interferometers is the Sagnac interferometer. This interferometer includes multiple mirrors that are arranged to establish propagating beams in a ring path. When the interferometer is rotated, a relative phase shift is generated between of the beams. The sensitivity for rotations depends on the area covered by the ring, multiplied by the number of round trips.

An additional type of interferometers is the Fabry-Pérot Interferometer. A Fabry-Pérot interferometer typically includes two parallel and partially transmissive mirrors, allowing for multiple round trips of light. An interferometer of this type can have very sharp resonances and can therefore be used to measure distances or changes of distances with a resolution better than the wavelength.

A Fizeau interferometer is similar to the Fabry-Pérot Interferometer except that the second mirror is totally reflective, and slightly tilted.

SUMMARY OF THE INVENTION

According to an aspect of some embodiments of the present invention there is provided an interferometer system. The interferometer system comprises: a sample interferometer arm for guiding a first wave to a sample, and receiving a reflected wave from the sample; a phase amplifier for amplifying a phase shift of the reflected wave, to provide phase-shift-amplified intermediate wave; an additional interferometer arm for guiding an additional wave to combine with the intermediate wave, to provide an output wave; and a detector for detecting the output wave.

According to some embodiments of the invention the system comprises at least one amplitude controller configured to ensure that the intermediate wave and the additional wave are of approximately the same intensities.

According to some embodiments of the invention the phase-shift amplifier comprises an amplitude controller configured to ensure that an amplitude of the intermediate wave differs from an amplitude of the reflected wave.

According to some embodiments of the invention the system comprises a light source for generating an input wave to be coupled into the interferometer arms.

According to some embodiments of the invention the system comprises a wave splitter system for receiving the input wave and providing the first wave and the additional wave.

According to some embodiments of the invention the phase shift amplifier comprises: a wave splitter system for receiving an input wave and providing the first wave and a second wave; an amplitude controller for controlling amplitude of at least one of the first and the second waves; a phase controller for maintaining a phase shift of about $\pi$ radians between the first and the second waves; and a wave combiner for combining the sample and the second waves, wherein the amplitude controller ensures that amplitudes of the waves satisfy the relation $A_1/\Delta A = G$ or the relation $A_2/\Delta A = G$, wherein $A_1$ and $A_2$ are the amplitudes of the first and the second waves, respectively, ΔA is defined as $|A_1-A_2|$ and G is a predetermined phase amplification factor.

According to some embodiments of the invention the phase controller comprises at least one of a movable reflector, a tunable optical delay line and a piezoelectric phase controller.

According to some embodiments of the invention the system comprises a wave source for generating the input wave.

According to some embodiments of the invention the wave splitter system is also configured to provide the additional wave.

According to some embodiments of the invention the amplitude controller comprises a polarizer.

According to some embodiments of the invention the wave source is a light source configured to provide infrared light.

According to some embodiments of the invention the wave source is a light source configured to provide visible light.

According to some embodiments of the invention the wave source is a light source configured to provide ultraviolet light.

According to some embodiments of the invention the wave source is a light source configured to provide monochromatic light.

According to some embodiments of the invention the wave source is a light source configured to provide polychromatic light.

According to some embodiments of the invention the wave source is a light source configured to provide bichromatic light.

According to some embodiments of the invention the wave source is a component in a wave generation system having a controller configured to scan a wavelength of the input wave.

According to some embodiments of the invention the system comprises an optical amplifier configured for amplifying the phase-shift-amplified intermediate wave.

According to some embodiments of the invention the system comprises a scanning stage configured for varying an optical length of at least one of the arms.

According to some embodiments of the invention the system comprises a controller configured to control the scanning stage so as to scan an optical path difference between the arms.

According to some embodiments of the invention the arms are arranged as Michelson interferometer arms.

According to some embodiments of the invention the arms are arranged as Mach-Zehnder interferometer arms.

According to some embodiments of the invention the arms are arranged as Sagnac interferometer arms.

According to some embodiments of the invention the arms are arranged as Fabry-Pérot interferometer arms.

According to some embodiments of the invention the arms are arranged as Fizeau interferometer arms.

According to an aspect of some embodiments of the present invention there is provided a method of interferometry. The method comprises: guiding a first wave to a sample; receiving a reflected wave from the sample; amplifying a phase shift of the reflected wave, to provide a phase-shift-amplified intermediate wave; combining an additional wave with the intermediate wave, to provide an output wave; and analyzing an interference pattern constituted by the output wave.

According to some embodiments of the invention phase-shift-amplified intermediate wave and the additional wave have the same frequency.

According to some embodiments of the invention the phase-shift-amplified intermediate wave and the additional wave have different frequencies.

According to some embodiments of the invention the method comprises changing amplitude of at least one of the intermediate wave and the additional wave to ensure that the intermediate wave and the additional wave are of approximately the same intensities.

According to some embodiments of the invention the method comprises changing amplitude of at least one of the intermediate wave and the reflected wave to ensure that the amplitudes of the intermediate wave and the reflected wave differ.

According to some embodiments of the invention the method comprises generating an input wave to be coupled into the interferometer arms and providing the first wave and the additional wave by splitting the input wave.

According to some embodiments of the invention the amplifying comprises: receiving an input wave and providing the first wave and a second wave; controlling amplitude of at least one of the first and the second waves; maintaining a phase shift of about π radians between the first and the beam waves, and combining the sample and the second waves, wherein the controlling the amplitude is to ensure that $A_1/\Delta A = G$ or $A_2/\Delta A = G$, wherein $A_1$ and $A_2$ are the amplitudes of the first and the waves, respectively, ΔA is defined as $|A_1-A_2|$ and G is a predetermined phase amplification factor.

According to some embodiments of the invention the input wave, the intermediate wave, and the additional waves are light beams.

According to some embodiments of the invention the input wave, the intermediate wave, the first wave, the second wave, and the additional waves are light beams.

According to some embodiments of the invention the input wave comprises infrared light.

According to some embodiments of the invention the input wave comprises visible light.

According to some embodiments of the invention the input wave comprises ultraviolet light.

According to some embodiments of the invention the input wave comprises monochromatic wave.

According to some embodiments of the invention the input wave comprises polychromatic wave.

According to some embodiments of the invention the input wave comprises polychromatic wave.

According to some embodiments of the invention the method comprises scanning a wavelength of the input wave.

According to some embodiments of the invention the method comprises varying an optical length of at least one of the arms.

According to some embodiments of the invention the method comprises amplifying a phase shift of said output wave.

According to some embodiments of the invention the method comprises converting said output wave to an output electrical signal by a wave detector and amplifying a phase shift of said output electrical signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to wave interference and, more particularly, but not exclusively, to interferometry employing phase-shift amplification.

Figure 1:
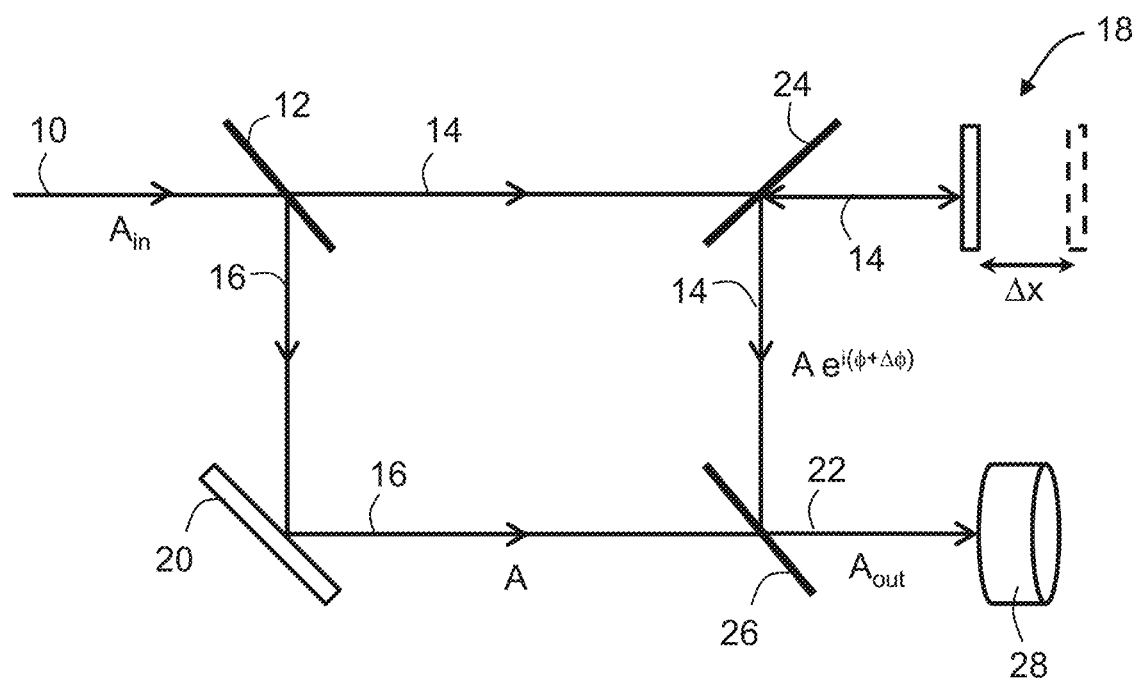
FIG. 1 is a schematic illustration of an interferometer of a Mach-Zehnder type.

For purposes of better understanding some embodiments of the present invention, as illustrated in FIGS. 2-9 of the drawings, reference is first made to the construction and operation of an interferometer of the Mach-Zehnder type as illustrated in FIG. 1.

An optical beam 10 having an input field $E_{in}=A_{in}e^{i\omega t}$ and power $P_{in}=|E_{in}|^2$ is split by a beam splitter 12 into two beams 14 and 16. Beam 14 is passes through a first partially reflective mirror 24 and continues to a moving object 18. Beam 14 is reflected off object 18, picks up a phase, and is redirected by mirror 24 towards a second partially reflective mirror 26. Beam 16 is redirected by a static mirror 20 also towards mirror 26 to recombine with beam 14 thereat, to form a combined beam 22, which is detected by a detector 28. The amplitudes of beams 16 and 14 before recombination at mirror 26 are denoted A and $Ae^{i(\phi+\Delta\phi)}$, respectively, and the amplitude of combined beam 22 is denoted $A_{out}$.

If the interferometer is initially biased so that the optical phase difference between the two arms is $\phi$, the output amplitude $A_{out}$ is:

$$A_{out}(\emptyset)=A\sqrt{2(1+\cos\emptyset)} \qquad \text{EQ. (1)}$$

For a small change in the optical phase $\Delta\phi$, the change in the output amplitude is $$\Delta A_{out} = \frac{-A\sin(\emptyset)}{\sqrt{2(1+\cos\emptyset)}}\Delta\emptyset \qquad \text{EQ. (2)}$$

so that $$\frac{\Delta A_{out}}{A_{out}} = \frac{-\sin(\phi)}{2(1+\cos(\phi))} \Delta \phi \qquad \text{EQ. (3)}$$

For practical applications, the sensitivity of the interferometer can be defined as the relative change in the output power for a change in optical phase, or a change in distance $\Delta x$ of object 18. The sensitivity $S_{MZ}$ of this interferometer by is given by:

$$S_{MZ} \equiv \frac{\Delta P_{out}(\phi)}{P_{out}} = 2\frac{\Delta A_{out}}{A_{out}} = \left|\frac{-\sin(\phi)}{1+\cos(\phi)} \Delta \phi \right| \qquad \text{EQ. (4)}$$

where $k=2\pi/\lambda$ is the wavenumber for light of wavelength $\lambda$.

The inventors of the present invention found that a substantial improvement in the performances of an interferometer can be achieved by amplifying the phase shift picked up by the wave that interacts with the object.

The inventors found that use of an amplified phase shift can improve the sensitivity and/or resolution of the interferometer by an order of magnitude or more. The inventors additionally found that the use of amplified phase shift improves the immunity to relative intensity noise (RIN) by increasing the signal to noise ratio (SNR) relative to a regular interferometer in the presence of RIN, both when caused directly and when caused by phase-to-intensity noise conversion. The inventors further found that the use of amplified phase shift can improve the immunity of the interferometer systems against nonlinear effects, distortion effects and/or quantization errors of peripheral components that may be employed, including, without limitation, light detectors and Analog-to-Digital converters. Such an improvement allows the interferometer system to operate close to the shot-noise limit.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Thus, according to some embodiments of the present invention there is provided an interferometer system, which comprises an interferometer and a phase amplifier, and which is capable of amplifying the phase shift picked up by the wave that interacts with a sample. In such a system, the interferometer receives an input wave and provides an intermediate wave that is phase shifted relative to the input wave, and the phase amplifier ensures that the phase shift of the intermediate wave is greater than the phase shift accrued by the wave that interacts with the sample due to this interaction. The intermediate wave is then combined with one or more additional waves.

The wave that interacts with a sample, the intermediate wave, and the one or more additional waves, are optionally and preferably electromagnetic waves. Typically, the electromagnetic waves are in the form of optical beams, but other, non-optical electromagnetic waves are also contemplated, according to some embodiments of the present invention. Representative example of non-optical electromagnetic waves include, without limitation, THz waves, microwaves, millimeter waves, and radiofrequency waves.

The embodiments below are described with a particular emphasis to optical waves. It is to be understood, however, that while optical waves are preferred, a more detailed reference to optical waves is not to be interpreted as limiting.

In the interferometer system optionally and preferably by a wave combiner. Representative examples of types of wave combiner suitable for the present embodiments include, without limitation, a semitransparent mirror (e.g., semitransparent optical mirror, when the wave is an optical beam), or an arrangement of waveguides (e.g., an arrangement of optical fibers when the wave is an optical beam).

In some embodiments of the present invention the interferometer system is a homodyne interferometer system, and in some embodiments of the present invention the interferometer system is a heterodyne interferometer system. When the interferometer system is a homodyne interferometer system, the intermediate wave and the additional wave are of the same frequency (e.g., optical frequency when the waves are optical beams). In the heterodyne interferometer system, more than one frequency is employed. For example, the intermediate wave can have a frequency $\omega_1$ and the additional wave can have a frequency $\omega_2$, where $\omega_1 \neq \omega_1$. When the intermediate wave and the additional wave are optical beams both frequencies $\omega_1$ and $\omega_2$ are optical frequencies.

Herein "optical frequency" means a frequency from about 30 THz to about 30 PHz, more preferably from about 100 THz to about 1000 THz.

Figure 2:
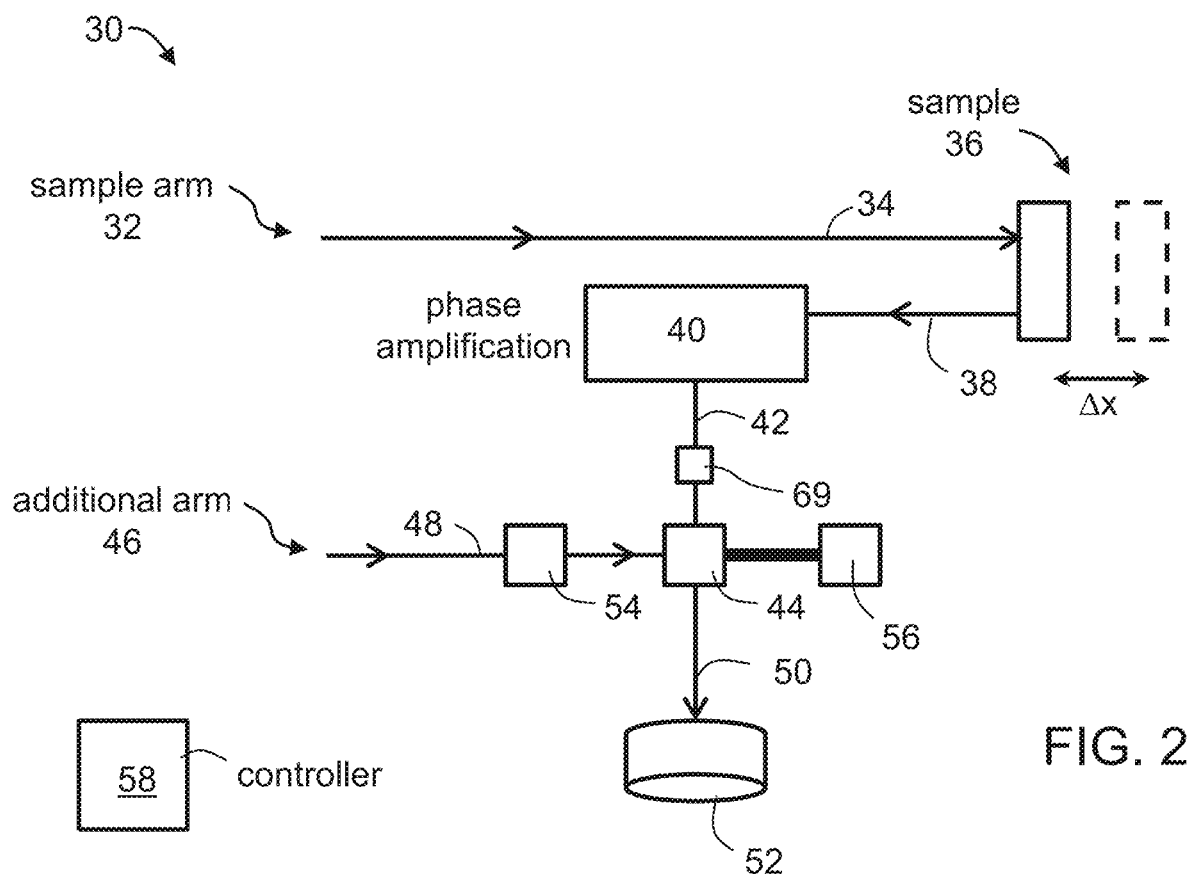
FIG. 2 is a schematic block diagram showing an exemplified configuration that can be used as an interferometer system according to some embodiments of the present invention.

FIG. 2 is a schematic block diagram showing an exemplified configuration that can be used as the interferometer system, according to some embodiments of the present invention. Shown in FIG. 2 is an interferometer system 30, which comprises a sample interferometer arm 32 for guiding a first wave 34 to a sample 36, and receiving a reflected wave 38 from sample 36. System 30 comprises a phase amplifier 40 for amplifying a phase shift of wave 38, optionally and preferably by a predetermined phase amplification factor G, to provide a phase-shift-amplified intermediate wave 42. System 30 further comprises an additional interferometer arm 46 that guides an additional wave 48 and combines with intermediate wave 42, e.g., by means of a wave 44 (e.g. an optical combiner when the waves are optical beams), such as, but not limited to, a tilted semi-transparent mirror or a fiber optic coupler, to provide an output wave 50, which is the coherent sum of beams 42 and 48. A detector 52 can detect wave 50. In a homodyne configuration, both waves 34 and 48 have the same frequency. In a heterodyne configuration, waves 34 and 48 have different frequencies.

In the schematic illustration of FIG. 2, which is not to be considered as limiting, a single additional arm 46 is illustrated. However, this need not necessarily be the case since in some embodiments two or more additional arm like arm 46 are included in system 30. In these embodiments, system 30 is arranged in concatenated manner, wherein the output wave of a particular arm 46 is combined with the wave of the next additional arm 46. Preferably, but not necessarily, the wave propagating in different additional arms 46 are of different frequencies.

System 30 may optionally and preferably comprise a wave source (not shown, see FIGS. 4, 7 and 8), for generating an input wave. The waves 34 and 48 that propagate in interferometer arms 32 and 46 can carry different portions of the energy of the input wave generated by the wavesource. For example, wave splitter system, e.g., a beam splitter system, when the wave is an optical beam, or a polarizing wave splitter, a polarizing beam splitter system, when the wave is an optical beam (not shown, see FIGS. 4, 7, 8, 10 and 11), can receive the input wave and provide at least waves 34 and 48.

The wave source can be configured to provide polychromatic or monochromatic wave characterized by any wavelength or wavelength range suitable for interferometry. Thus, in some embodiments of the present invention the wave source is a light source that provides infrared light (e.g., light having one or more wavelengths from about 700 nm to 1600 nm or higher), in some embodiments of the present invention wave source is a the light source that provides visible light (e.g., light having one or more wavelengths from about 400 nm to about 700 nm), and in some embodiments of the present invention the wave source is a light source that provides ultraviolet light (e.g., light having one or more wavelengths from about 300 nm to about 400 nm). The wave source can also be a component in a wave generation system having a controller (not shown) that scans the wavelength of the input wave, as known in the art of wavelength scanning interferometry. In some embodiments, the wave source is configured to provide a bichromatic wave having a two distinct peaks at a first central frequency $\omega_1$ and a second central frequency $\omega_2$, where each of the frequency $\omega_1$ and $\omega_2$ corresponds to a wavelength within one of the above wavelength ranges.

In some embodiments of the present invention phase amplifier 40 effects an amplitude change, aside for amplifying the phase shift. Typically, but not necessarily, phase amplifier 40 changes the phase and amplitude of wave 38 to ensure that the ratio between the amplitudes of waves 38 and 42 is approximately the same as the ratio between the phase shifts of waves 42 and 38 (namely the amplitude of wave 42 is smaller than that of wave 38 by the same factor as the factor by which the phase of wave 42 is larger than that of wave 38). A representative configuration for a phase amplifier suitable for some embodiments of the present invention is provided hereinbelow.

In some embodiments of the present invention system 30 comprises one or more amplitude controllers 69, 54 that control the amplitude of intermediate wave 42 and/or additional wave 48, respectively. These embodiments are particularly useful when phase amplifier 40 changes the amplitude of wave 38, so that controller 54 can ensure that the amplitudes of waves 48 and 42 are equal or approximately equal (e.g., within 10%). Typically, amplitude controller 54 is set to vary one or both amplitudes of waves 48 and 42.

For example, denoting the amplitude of wave 42 by $Be^{i\psi}$, wherein B is smaller than the amplitude of wave 34 by a factor that equals the predetermined phase amplification G, controller 54 can be set to ensure that the amplitude of additional wave 48 is B, so that each of waves has intensity of $B^2$. Typically, waves 48 and 34 are split off the same input wave (not shown), and so initially have approximately the same amplitude. In these embodiments, controller 54 can be set to reduce the amplitude of wave 48 by a factor that equals the predetermined phase amplification G.

In the representative illustration shown in FIG. 2, one controller 54 is positioned on arm 46 and operates to control the amplitude of wave 48, and one controller 69 is positioned at the output of to control the amplitude of wave 42, but this need not necessarily be the case, since, for some applications, it may not be necessary to change the amplitude of both waves 48 and 42. For example, system 30 can operate with controller 54 and without controller 69, or with controller 69 and without controller 54, or with without both controllers 54 and 69.

When controller 69 is used for controlling the amplitude of wave 42, it is optionally and preferably configured as a wave amplifier (e.g., an optical amplifier when the waves are optical beams) that compensates for the reduction in amplitude in wave 38. The advantage of this embodiment is that it improves the sensitivity of system 30 in the presence of certain noise sources such as RIN, since the amplitude of wave 42 is increased prior to its combination with wave 48 leading to a combined wave 50 with higher amplitude and intensity. For example, using the above notation for the amplitude of wave 42 and the phase amplification, controller 69 can be set to increase the amplitude of wave 42 by a predetermined factor G', so that the amplified amplitude of wave 42 is $G'Be^{i\psi}$. Preferably, the factor G' is selected to be the same or similar (e.g., within 10%) to G. When both controllers 54 and 69 are employed, controller 54 is optionally and preferably configured to ensure that the amplitude of wave 48 is the same or similar (e.g., within 10%) as the amplified amplitude of wave 42. These embodiments are particularly useful what system 30 is a homodyne system. When system 30 is a heterodyne system, it is not necessary, to ensure that the amplitude of waves 48 and 42 are the same or similar. For the heterodyne configuration, the amplitude or intensity of wave 48 can considerably higher than that of wave 42, so that the output of system 30 is higher in intensity, compared to the case in which the amplitude of waves 48 and 42 are the same or similar.

Amplitude controller 54 can be of any type known for controlling the amplitude of a signal (e.g., an optical signal when the wave is an optical beam). Representative examples include, without limitation, a passive controller, such as, but not limited to, a polarizer, and an active controller, such as, but not limited to, an electro-optical amplitude controller.

Amplitude controller 69 can be of any type known for amplifying the amplitude of a signal (e.g., an optical signal when the wave is an optical beam). Representative examples include, without limitation, an Erbium Doped Fiber Amplifier (EDFA), a Semiconductor Optical Amplifier (SOA), an optical amplifier based on second-order or third-order non-linear optical effects, a Raman amplifier, a Brillouin amplifier, or any other type of optical amplification process.

Arms 32 and 46 can be arranged in any configuration known in the art. In some embodiments of the present invention arms 32 and 46 are arranged as Mach-Zehnder interferometer arms, in some embodiments of the present invention arms 32 and 46 are arranged as Michelson interferometer arms, in some embodiments of the present invention arms 32 and 46 are arranged as Sagnac interferometer arms, in some embodiments of the present invention arms 32 and 46 are arranged as Fabry-Pérot interferometer arms, and in some embodiments of the present invention arms 32 and 46 are arranged as Fizeau interferometer arms.

It is expected that during the life of a patent maturing from this application many relevant interferometry technologies will be developed and the scope of the terms sample interferometer arm and additional interferometer arm is intended to include all such new technologies a priori.

In some embodiments of the present invention system 30 comprises a scanning stage 56 configured for varying an optical length of at least one of arms 32 and 46, so as to scan the wave path difference (e.g., OPD when the waves are optical beams) between the arms. In the schematic illustration shown in FIG. 2, which is not to be considered as limiting, scanning stage 56 is arranged to move to wave combiner 44, but this need not necessarily be the case, since, for some applications, other component of system 30 can be moved to effect the change in the wave path difference (e.g., OPD), as known, for example, in the art of coherence scanning interferometry. Optionally, system 30 comprises a controller 58 configured to control scanning stage 56 to effect the OPD scan. For clarity of presentation, communication lines between controller 58 and stage 56 are not shown.

In the homodyne configuration, wave 50 has the same frequency as the input to sample arm 32, and the amplified phase shift effects an amplification of the intensity of wave 50, so that the intensity of wave 50 is larger than the intensity $B^2$ of wave 42, where the ratio between the intensity of wave 50 and the intensity of wave 42 is set by the value of the amplified phase-shift. For example, the ratio between the intensities of waves 50 and 42 can be 1+cos ($\phi$+G$\Delta\phi$), where G$\Delta\phi$ is the amplified phase shift relative to the phase $\phi$ of the wave input to sample arm 32.

In the heterodyne configuration, wave 50, which is the combination of wave 42 with a frequency denoted $\omega_1$ and wave 48 with a frequency denoted $\omega_2$, can be described as having a carrier frequency which is the sum $\omega_2+\omega_1$ modulated by a beat signal having a frequency $\omega_2-\omega_1$, where the beat signal is shifted by an amplified phase shift $\phi$+G$\Delta\phi$. Typically, but not necessarily, the frequencies $\omega_1$ and $\omega_2$ are selected such that the difference $\omega_2-\omega_1$ is in the radiofrequency range. In other embodiments, the difference $\omega_2-\omega_1$ is in a range other than the radiofrequency range (e.g., the optical range)

The present embodiments contemplate subjecting the output of detector 52 or output wave 50 to a further phase amplification by an additional phase amplification system. These embodiments are particularly useful when system 30 is a heterodyne interferometer system, wherein the beat signal is shifted by an amplified phase shift. A further phase amplification can be done, for example, by the technique disclosed in International Publication No. WO2018/189737, the contents of which are hereby incorporated by reference.

Figure 13A:
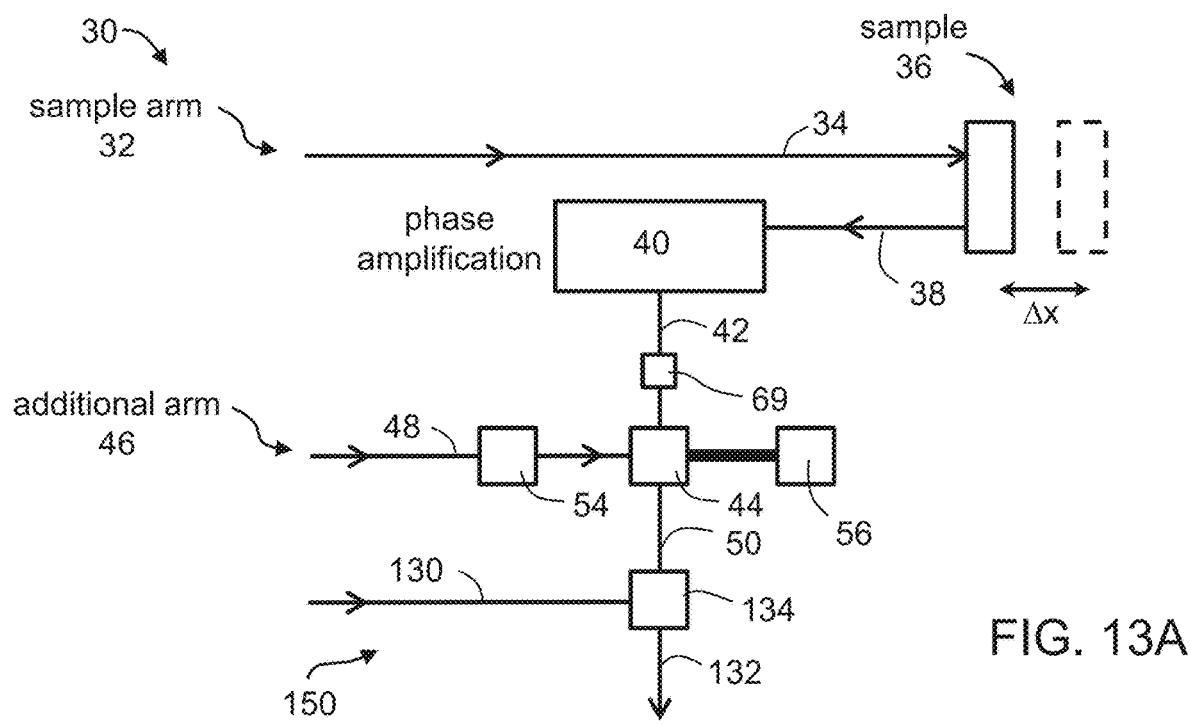
FIGS. 13A and 13B are schematic illustration of a configuration suitable for further amplifying the phase shift of the output of the interferometer system according to some embodiments of the present invention.

FIG. 13A is a schematic illustration of an additional phase amplification system 150 in a configuration suitable for further amplifying the phase shift of wave 50. A reference wave 130 is provided and is combined with wave 50, using a wave combiner 134, optionally and preferably by linear combination, to provide a combined wave 132 having phase shift that is amplified compared to the phase shift of wave 50. The reference wave 130 optionally and preferably has the same carrier frequency and modulation frequency as wave 50. The modulated amplitudes of wave 50 and reference wave 130 are typically sufficiently close to each other (e.g., the ratio between the amplitudes is from about 0.9 to about 1.1), and the phase difference between wave 50 and reference wave 130 is optionally and preferably close to $\pi$ radians (for example, when the cosine of this phase difference, in absolute value, is more than 0.9 and less than 0.9999). As a representative example, which is not to be considered as limiting, reference wave 130 can be obtained by splitting it out of the wave 34 or the input wave to arm 32 (see wave 62 below), modulating it, and controlling its amplitude using an amplitude controller and a phase controller as described herein such as to ensure that the amplitudes of wave 50 and the reference wave 130 are close to each other and the phase difference between wave 50 and the reference wave 130 is close to $\pi$.

Combining the reference wave 130 and wave 50 results in an amplification of the phase shift of wave 50 by a factor of 1/$\alpha$, where $\alpha$ is the absolute value of the difference between 1 and the ratio between modulation amplitudes of the waves.

Figure 13B:
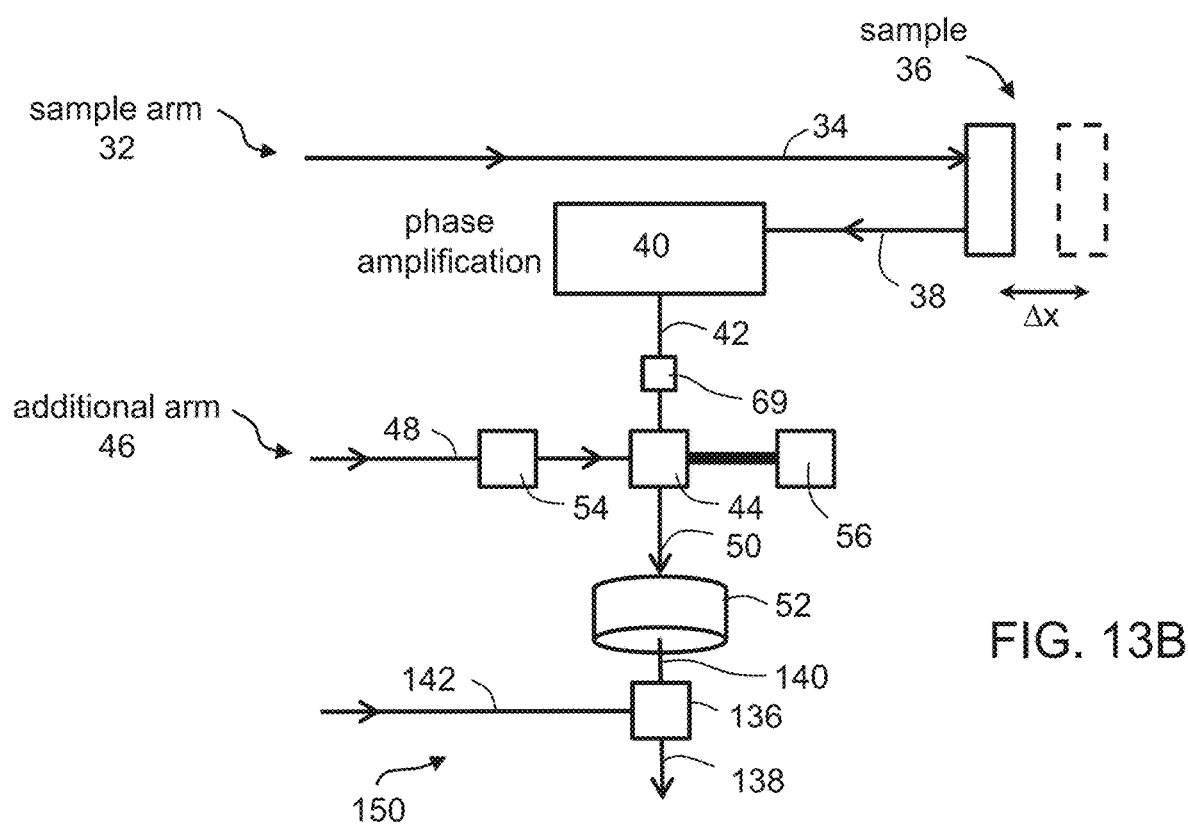

FIG. 13B is a schematic illustration of additional phase amplification system 150 in a configuration suitable for further amplifying the output signal 140 of detector 52. Unlike wave 50, signal 140 is an electrical signal that is typically unmodulated. A reference electrical signal 142 is provided and its amplitude is combined, using an electrical signal combiner 136, optionally and preferably by linear combination, with the output signal 140 of detector 52, to provide a combined electrical signal 138 having a phase shift which is amplified relative to the phase shift of signal 140. The reference signal 142 optionally and preferably has the same frequency as signal 140. The amplitudes signal 140 and reference signal 142 are typically sufficiently close to each other (e.g., the ratio between the amplitudes is from about 0.9 to about 1.1), and the phase difference between signal 140 and reference signal 142 is optionally and preferably close to $\pi$ radians (for example, when the cosine of this phase difference, in absolute value, is more than 0.9 and less than 0.9999). As a representative example, which is not to be considered as limiting, reference signal 142 can be obtained by locking on a signal from wave source that generates wave input to arm 32 (see wave 62 below) and controlling its amplitude using an amplitude controller and a phase controller as described herein such as to ensure that the amplitudes of signal 140 and the reference signal 142 are close to each other and the phase difference between signals 140 and 142 is close to $\pi$.

Combining the reference signal 142 and signal 140 results in an amplification of the phase shift of signal 140 by a factor of 1/$\alpha$, where $\alpha$ is the absolute value of the difference between 1 and the ratio between amplitudes of the signals.

Figure 3:
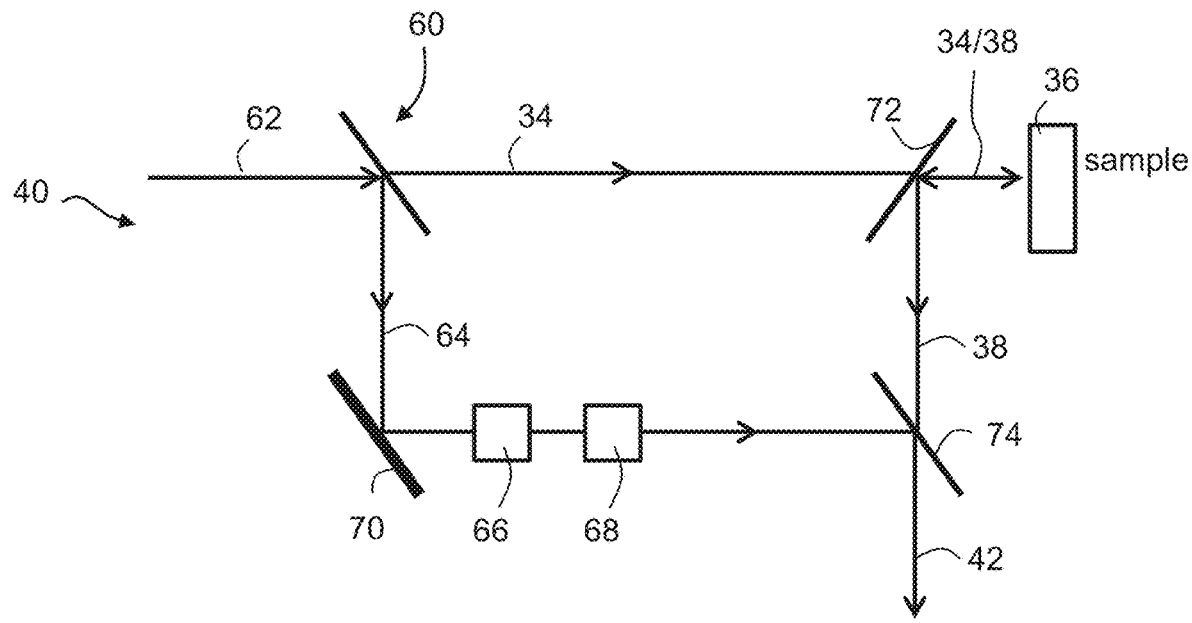
FIG. 3 is a schematic illustration of a configuration suitable for being used as a phase amplifier, according to some embodiments of the present invention.

FIG. 3 is a schematic illustration of a configuration suitable for being used as phase amplifier 40, according to some embodiments of the present invention. In the illustrated embodiment, phase amplifier 40 comprises a wave splitter system 60 for receiving an input wave 62 and providing first wave 34 and a second wave 64. In some embodiments, system 60 is also used for providing the additional wave 48 (not shown in FIG. 3).

Waves 34 and 64 can be guided in free space, or within a waveguide (not shown), as desired. In the representative illustration of FIG. 3, wave 64 is guided in free space by a reflector 70 or an arrangement of reflectors, and wave 34 propagates to a wave coupler 72 (which can be embodied, for example, as a semi-transparent mirror), from which the wave continues to sample 36. The reflected wave 38 propagates back to coupler 72 that redirects it to a wave combiner 74 (which can also be embodied as a tilted semi-transparent mirror), at which waves 64 and 38 are combined to form wave 42.

Phase amplifier 40 optionally and preferably comprises an amplitude controller 66 that controls the amplitude of one or both of waves 34 and 64. Amplitude controller 66 can be of any type described above with respect to amplitude controller 54. In the illustration shown in FIG. 3, controller 66 is arranged to control the amplitude of wave 64, but this need not necessarily be the case, since, for some applications, controller 66 can be arranged to control the amplitude of wave 38. Also contemplated are embodiments in which one amplitude controller controls the amplitude of wave 38 and one amplitude controller controls the amplitude of wave 64.

Preferably, the amplitude controller (e.g., controller 66) ensures that the ratio between the amplitudes of waves 34 and 64 is from about 0.5 to about 1.5 but not 1, or from about 0.7 to about 1.3 but not 1, or from about 0.9 to about 1.1 but not 1, or from about 0.95 to about 1.05 but not 1, or from about 0.99 to about 1.01 but not 1, or from about 0.995 to about 1.005 but not 1, or from about 0.999 to about 1.001 but not 1, or from about 0.9995 to about 1.0005 but not 1, or from about 0.9999 to about 1.0001 but not 1.

It was found by the present Inventors that such a ratio can ensure phase shift amplification. The expected amplification factor G is typically about $1/\alpha$, where $\alpha$ is the absolute value of the difference between 1 and the ratio between the amplitudes of waves 34 and 64. Thus, the amplitude controller (e.g., controller 66) is optionally and preferably set to change the amplitude of wave 64 or 34 such that the absolute value of the difference between 1 and the ratio between the amplitudes of waves 34 and 64 equals a predetermined value a which is the reciprocal of a predetermined phase amplification factor G. Thus, denoting the amplitude of wave 34 by A, controller 66 optionally and preferably set the amplitude of wave 64 to $A(1-G^{-1})$.

Phase amplifier 40 preferably also comprises a phase controller 68 for maintaining a predetermined phase shift between waves 34 and 64.

Phase controller 68 can be of any type known for controlling the phase of a signal (e.g., an optical signal when the wave is an optical beam). Representative examples include, without limitation, reflector, a movable reflector, an electro-optical phase controller, a tunable optical delay line and a piezoelectric phase controller.

In various exemplary embodiments of the invention phase controller 68 ensures that waves 34 and 64 are generally at opposite phases, by maintaining between waves 34 and 64 a phase shift that is from about $\pi-\varepsilon$ radians to about $\pi+\varepsilon$, where $\varepsilon$ is a constant parameter that typically satisfies $-1/G \leq \varepsilon \leq 1/G$. In some embodiments of the present invention $\varepsilon$ is, in absolute value, less than 0.3 radians, or less than 0.1 radians or less than 0.01 radians or less than 0.001 radians.

Thus, following the changes applied to wave 64 by controllers 66 and 68, the field of wave 64 according to preferred embodiments of the present invention approximately equals to:

$$A(1-G^{-1})e^{i(\phi+\pi+\varepsilon)+i\omega_1 t}, \qquad \text{EQ. (5)}$$

where $\phi$ and $\omega_1$ are, respectively, the phase and angular frequency of the field of wave 34 upon arrival at coupler 72.

Interferometer system 30 is typically used for measuring variations (such as, but not limited to, a change $\Delta x$ in the position of sample 36, see FIG. 2). Since the parameter $\varepsilon$ is constant, its contribution to the variation to be measured typically cancels. Therefore, without loss of generality, $\varepsilon$ will hereinafter be omitted. Denoting the phase shift picked up by wave 38 following the interaction with sample 36 by $\Delta\phi$, the field of wave 38 upon arrival to wave combiner 74 approximately equals to $$Ae^{i(\phi+\Delta\phi)+i\omega_1 t}, \qquad \text{EQ. (6)}$$

The field of the output wave 42 is the coherent sum of the fields of waves 38 and 64. In case in which controllers 66 and 68 provide the field of EQ. 5, the field of the output wave 42 approximately equals to:

$$(A/G)e^{i(\phi+G\Delta\phi)+i\omega_1 t}. \qquad \text{EQ. (7)}$$

Thus, according to EQ. 7, phase amplifier 40 successfully amplifies the phase shift $\Delta\phi$ of wave 38, and also reduced its amplitude A, wherein both the amplification and reduction is by the same factor G. A detailed mathematical derivation of EQ. 7 is provided in the Examples section that follows.

Figure 4:
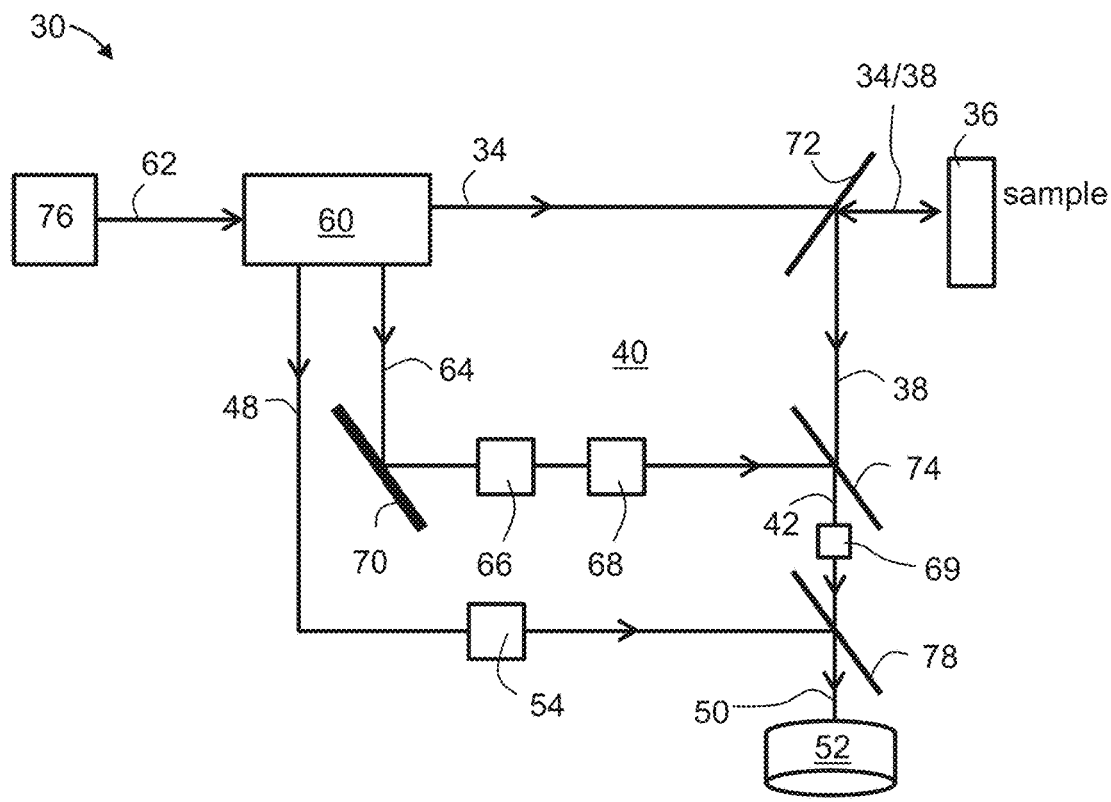
FIG. 4 is a schematic illustration of an interferometer system in a configuration in which the interferometer arms are arranged as Mach-Zehnder interferometer arms, according to some embodiments of the present invention.

FIG. 4 is a schematic illustration of system 30 in embodiments in which phase amplifier 40 includes the configuration illustrated in FIG. 3. FIG. 4 illustrates system 30 in a configuration in which arms 32 and 46 are arranged as Mach-Zehnder interferometer arms, but it is to be understood that while the embodiments below are described with a particular emphasis to Mach-Zehnder configurations, some embodiments of the present invention contemplates other arrangements for interferometer arms 32 and 46 (e.g., to form a Michelson interferometer or a Sagnac interferometer or a Fabry-Pérot interferometer or a Fizeau interferometer or the like).

Shown in FIG. 4 is a wave source (e.g., a light source) or a wave generating system 76 (e.g., a light generating system) generating input wave 62. Wave splitter system 60 receives input wave 62 from the wave source or wave generating system and provides first wave 34, second wave 64 and additional wave 48. Wave splitter system 60 can be of any type suitable to receive a wave and output three waves. In the simplest configuration, wave splitter system 60 comprises two tilter semi-transparent reflectors (see, for example, FIGS. 7 and 8 in the Examples section that follows), but other types of wave splitter systems, such as, but not limited to, wave splitter systems employing waveguides (e.g., fiber optics), are also contemplated. In embodiments in which system 30 is a heterodyne system, input wave 62 comprises more than one frequency, e.g., frequencies $\omega_1$ and $\omega_2$, and wave splitter system 60 is preferably configured to split wave 62 in a manner that each of waves 34 and 64 has a different frequency. Without loss of generality, the frequency of wave 34 is denoted $\omega_1$ and the frequency of wave 64 is denoted $\omega_2$.

First wave 34 propagates to interact with sample 36 as further detailed hereinabove, and second wave 64 propagates, optionally and preferably through controllers 66 and 68, towards combiner 74 at which it is combined with reflected wave 38 to form wave 42 as further detailed hereinabove. Wave 42 is optionally and preferably amplified by controller 69 as further detailed hereinabove.

Additional wave 48 propagates separately from waves 34 and 64, optionally and preferably through controller 54, towards a second wave combiner 78, which can be similar to wave combiner 44, e.g., embodied for example, as a tilted semi-transparent mirror or a fiber optic coupler, at which wave 48 is combined with wave 42 to form wave 50 as further detailed hereinabove. Detector 52 detects wave 50 and analyzes the interference patterns constituted by it to determine one or more properties of sample 36.

While controller 69 is shown between wave combiners 74 and 78, this need not necessarily be the case. The present embodiments contemplate any location for controller 69 on any arm of system 30. Representative example, include, without limitation, within the wave path of wave 34, before wave splitter system 60, etc.

Figure 5:
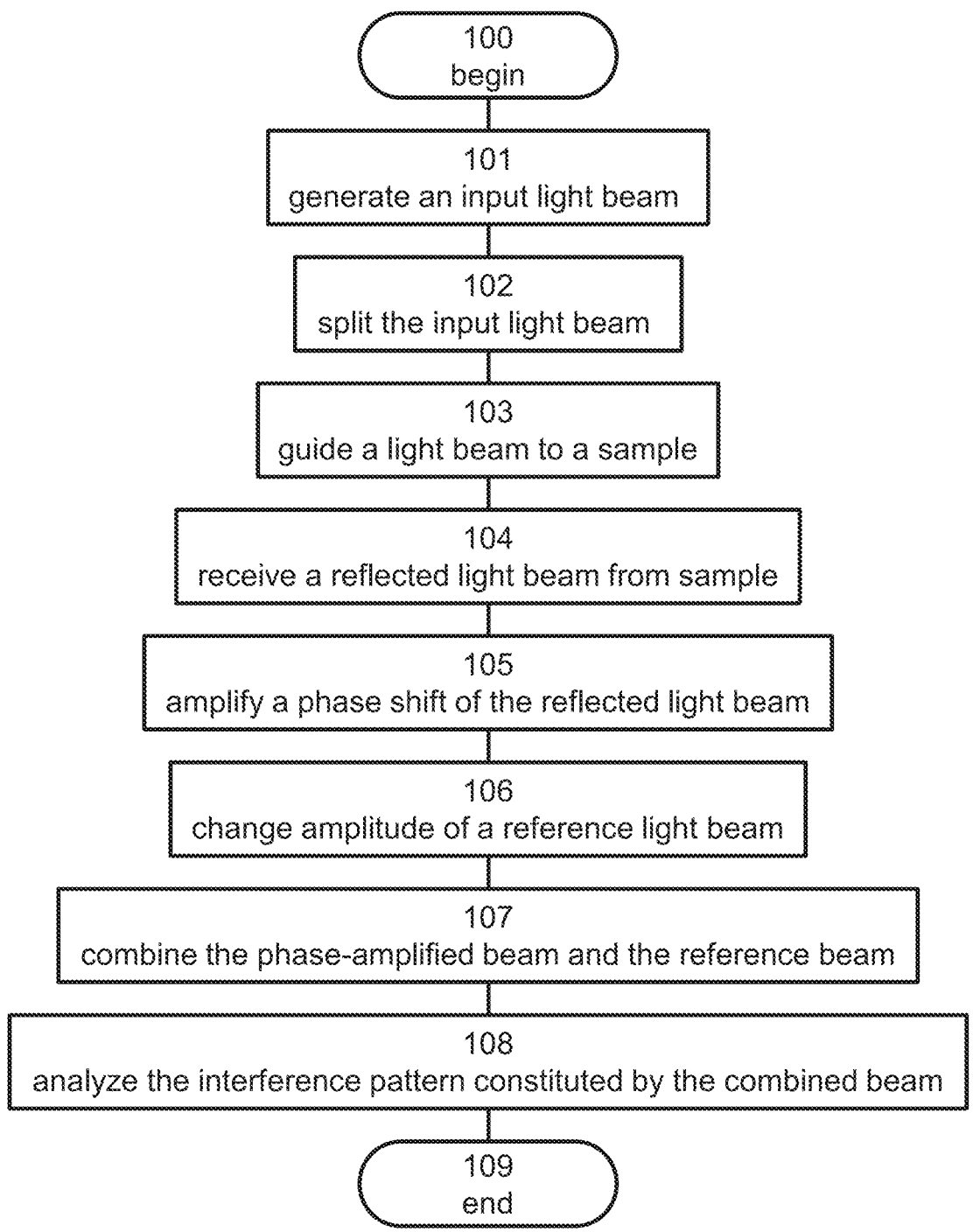
FIG. 5 is a flowchart diagram of a method suitable for interferometry, according to various exemplary embodiments of the present invention.

FIG. 5 is a flowchart diagram of a method suitable for interferometry, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 100 and optionally and preferably continues to 101 at which an input wave is generated. The input wave can be monochromatic or polychromatic or bichromatic of any of the aforementioned wavelengths or wavelength ranges. The method optionally continues to 102 at which the input wave is split to form a first wave (e.g., wave 34) an additional light (e.g., wave 48), and optionally also a second wave (e.g., wave 64). Waves 34 and 48 can be of the same or different frequencies as further detailed hereinabove.

At 103 a wave (e.g., the first wave provided at 102) is guided to a sample, whose properties are to be determined (e.g., sample 36), and at 104 a reflected wave (e.g., wave 38) is received from the sample. The method optionally and preferably continues to 105 at which a phase shift of the reflected wave is amplified, to provide a phase-amplified intermediate wave. The method can optionally continue to 106 at which the amplitude of the intermediate wave and/or the additional wave is changed to ensure that the intermediate and additional waves are of approximately the same intensities as further detailed hereinabove. Alternatively, the amplitude or intensity of the additional wave can be considerably higher than that of the intermediate, phase amplified, wave, as further detailed hereinabove for the heterodyne configuration.

The method preferably continues to 107 at which the additional wave and the intermediate, phase amplified, wave are combined to provide an output wave as further detailed hereinabove. The method can then continue to 108 at which the interference pattern constituted by the output wave is analyzed to determine the properties of the sample. Typically, but not necessarily, the analysis is firstly executed to extract from the interference pattern (e.g., from the distances between intensity maxima and minima) the phase difference between the phase-amplified wave and the additional wave. This phase difference can then be divided by the amplification factor G, to provide the phase picked up by the reflected wave as a result of the interaction. From this phase, the property of the sample can be obtained by correlating the picked up phase to the desired property.

Method 100 of the present embodiments can be used to perform many types of measurements. Representative examples include, without limitation, measurements of lengths and changes in length, optical testing, measurements surface structures, spectral imaging, measurements of the pressure distribution in gas flows or plasmas, measurements of temperature distribution in gas flows or plasmas, measurements of velocities, measurements of vibration amplitudes; measurements of rotation speeds, measurements field strengths (e.g., electric field strength, magnetic field strength), measurements of wavelength, astronomic measurements (e.g., angular diameter of stars), applications which utilize $\pi$ phase shift, such as reflection from a dielectric or a metal, thin-film characterization, displacement measuring interferometry, surface plasmon polariton interferometry, and optical gyroscope.

The type of analysis executed in 108 can be selected depending on the type of measurement for which method 100 is executed. For example, when it is desired to measure a change in the position of a moving object (e.g., the change $\Delta x$ in the position of sample 36, see FIG. 2), the change $\Delta x$ can be calculated as $\Delta \phi = 2k\Delta x$, where k is the wavenumber of the light as detailed hereinabove.

The method ends at 109.

Figure 6:
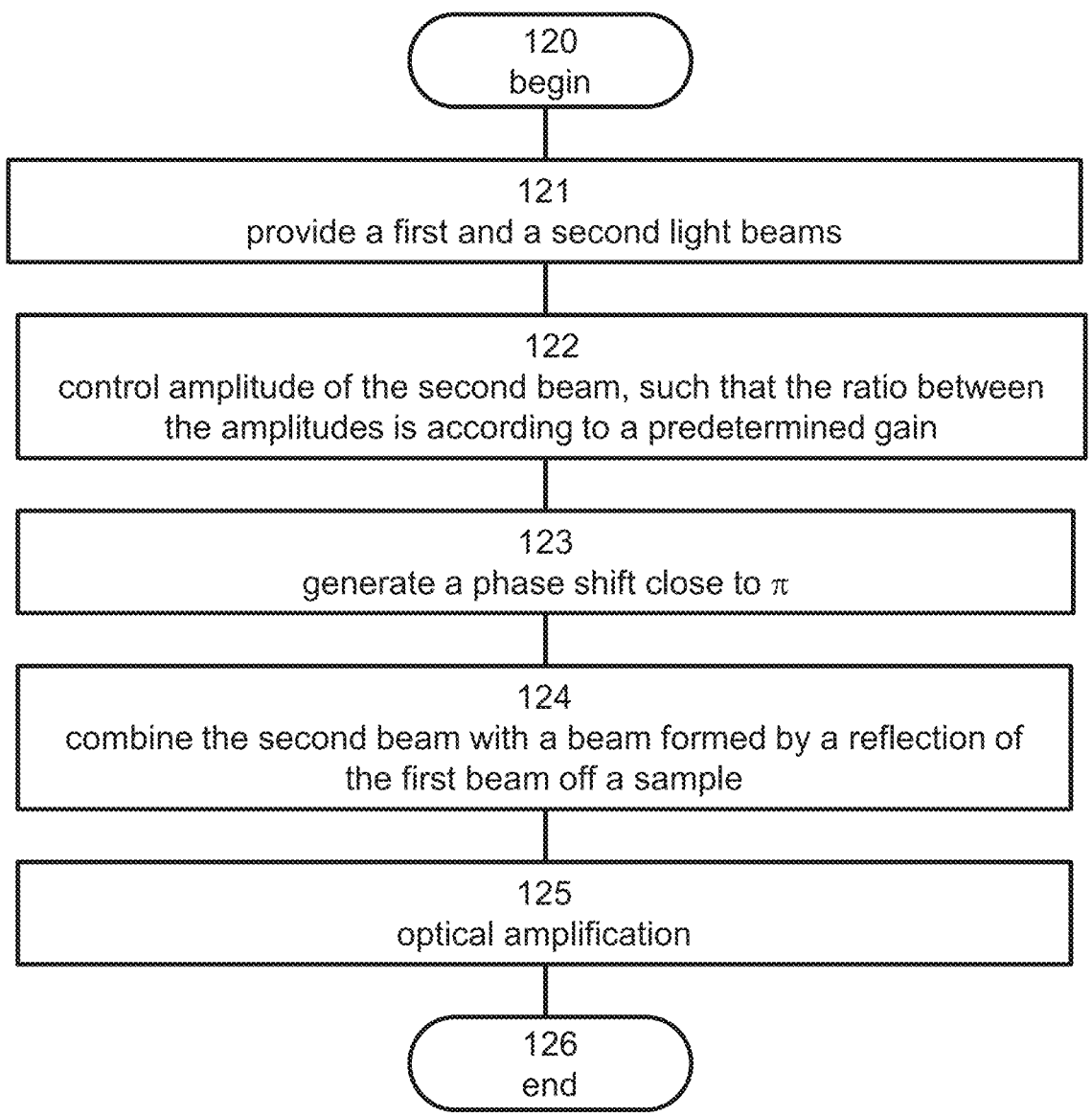
FIG. 6 is a flowchart diagram of a procedure suitable for executing an amplification operation in the method shown in FIG. 5, according to some embodiments of the present invention.

FIG. 6 is a flowchart diagram of a procedure suitable for amplifying a phase of a wave, according to various exemplary embodiments of the present invention. The procedure is particularly useful for executing operation 105 of method 100.

The procedure begins at 120 and continues to 121 at which a first wave and a second wave are provided. For example, the first and second waves can be obtained by splitting an input wave as further detailed hereinabove. The method continues to 122 at which the amplitude of one or both of the waves is controlled to ensure that the amplitudes are different from each other, and to ensure a predetermined ratio therebetween. For example, the amplitude(s) can be controlled such that the ratio between the amplitudes is from about 0.5 to about 1.5 but not 1, or from about 0.7 to about 1.3 but not 1, or from about 0.9 to about 1.1 but not 1, or from about 0.95 to about 1.05 but not 1, or from about 0.99 to about 1.01 but not 1, or from about 0.995 to about 1.005 but not 1, or from about 0.999 to about 1.001 but not 1, or from about 0.9995 to about 1.0005 but not 1, or from about 0.9999 to about 1.0001 but not 1.

Typically, the ratio between the amplitudes is selected such that the amplitudes satisfy the relation $A_1/\Delta A=G$ or the relation $A_2/\Delta A=G$, where $A_1$ and $A_2$ are the amplitudes of the first and second waves, respectively, $\Delta A \equiv |A_1-A_2|$ and G is the predetermined phase amplification factor described above.

The method continues to 123 at which a phase shift that is close to $\pi$ radians between the waves is generated, and to 124 at which the second wave is combined with a wave formed by a reflection of the first wave from the sample, to provide a phase amplified wave. Optionally and preferably the method proceeds to 125 at which the amplitude of the phase amplified wave is amplified (e.g., optically amplified, when the wave is an optical beam), for example, by controller 69, as further detailed hereinabove.

The method ends at 126.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Homodyne Phase-Shift Amplified Interferometry

This Example demonstrates a technique for improving the sensitivity of a homodyne interferometer, according to some embodiments of the present invention. The technique is referred to in this Example as homodyne Phase-shift Amplified Interferometry (PAI), and is based on two embedded interferometers. An inner interferometer, which is biased in anti-phase, is designed and constructed to amplify the phase-shift. An outer interferometer, operating in the same optical frequency as the inner interferometer, is designed and constructed to convert the amplified phase-shift into an amplified intensity shift.

In interferometric systems, several types of noise and nonlinear effects accompany the desired signal. These noise sources and distortion components can change the statistical properties of the signal and degrade the system performance. Thus, the interferometer sensitivity is limited by photonic and electronic noise, nonlinearity of the optical detector and A/D converter (ADC) and quantization error of the ADC.

This Example demonstrates that the PAI of the present embodiments successfully reduces the effect of these noise sources and can reach the shot-noise limited regime.

Design Considerations

Figure 7:
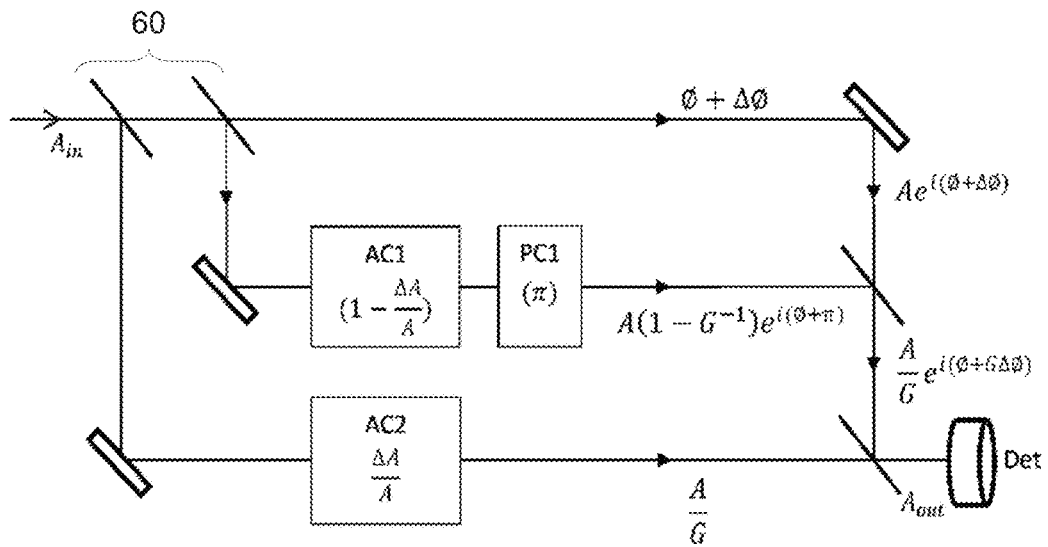
FIG. 7 is a schematic illustration of a design of a homodyne phase-shift amplified interferometer designed for experiments performed according to some embodiments of the present invention.

A schematic of the homodyne PAI interferometer used in this Example according to some embodiments of the present invention is shown in FIG. 7. It consisted of two embedded Mach-Zehnder interferometers (MZI). The upper two arms formed the inner MZI, where the small phase-shift $\Delta\varnothing$ to be monitored forms on its signal arm. The purpose of the inner MZI was to amplify $\Delta\varnothing$. The output of the inner MZI then underwent further interference with the bottom arm to form an outer MZI, whose purpose was to convert the amplified phase-shift to an amplified intensity shift. The optical frequencies of the light beams in the inner and outer MZI were the same. The inner MZI contained both amplitude and phase controllers (AC1, PC1 respectively), while the outer MZI contained an amplitude controller (AC2). The amplitude and phase controllers were set to bias the system, as further detailed hereinbelow. The approximate values of the relative field amplitudes and phases are shown in each arm. In what follows, all of the denoted amplitudes refer to their RMS values.

In the inner MZI, the reference arm was phase-biased with the aid of PC1 to ensure that the signal and reference were close to $\pi$ out of phase (it is assumed in this Example that the incremental phase shift $\Delta\phi$ is sufficiently small so that it does not change this situation), and the amplitude of the reference arm was set to be slightly offset from that of the signal amplitude A by a factor of $1-\Delta A/A$, where $\Delta A$ is the difference in amplitude between the signal and reference arms. Summing the signal and reference leads to $$Ae^{i(\phi+\Delta\phi)} + A\left(1 - \frac{\Delta A}{A}\right)e^{i(\phi+\pi)} = Be^{i\psi} \qquad \text{EQ. (1.1)}$$

Where $$B = A\left(1 + 2\left(\frac{\Delta A}{A} - 1\right)\cos(\Delta\phi) + \left(1 - \frac{\Delta A}{A}\right)^2\right)^{\frac{1}{2}} \qquad \text{EQ. (1.2)}$$

and $$\psi = \phi + \Delta\psi = \phi + \tan^{-1}\left(\frac{\left(\frac{\Delta A}{A} - 1\right)\sin(\Delta\phi)}{1 + \left(\frac{\Delta A}{A} - 1\right)\cos(\Delta\phi)}\right) \qquad \text{EQ. (1.3)}$$

The phase amplification is defined as $$G \equiv \frac{\Delta\psi}{\Delta\phi} \qquad \text{EQ. (1.4)}$$

For $\Delta\phi \ll 1$, $G \approx A/\Delta A$, and the output amplitude and phase of the internal MZI are $$B \approx A/G \qquad \text{EQ. (1.5a)}$$

$$\psi = \varnothing + G\Delta\varnothing \qquad \text{EQ. (1.5b)}$$

The small phase shift is amplified by G, and the output amplitude is reduced by the same factor G.

The output of the internal MZI now interferes with a further reference arm, where the reference amplitude is set equal to B, so that the final output intensity is $$I_{outPAI} = |A_{outPAI}|^2 = 2B^2(1+\cos(\omega)) \qquad \text{EQ. (1.6)}$$

In interferometry the sensitivity S is typically defined as the relative change in the output intensity $I_{out}$ for an incremental phase-shift $\Delta\phi$. Mathematically, this can be written as $S \equiv |\Delta I_{out}(\Delta\phi)|/I_{out}$. Higher sensitivity improves the immunity of the system against nonlinear and distortion effects of the photodetector and the ADC. In addition, it reduces the impact of the laser relative intensity noise (RIN) and ADC quantization error. For PAI, $$\Delta I_{outPAI} = -2B^2(\sin(\omega))\Delta\psi \qquad \text{EQ. (1.7)}$$

so that the PAI sensitivity is $$S_{PAI} = \left| \frac{-\sin(\psi)}{1+\cos(\psi)} \Delta\psi \right| = \left| \frac{-\sin(\psi)}{1+\cos(\psi)} G\Delta\phi \right| \qquad \text{EQ. (1.8)}$$

This result can be compared to the sensitivity of a conventional two-path MZI For signal and reference paths having equal amplitudes D and a phase-difference of $\psi$ between them, the output of a conventional MZI is $$I_{out_{MZI}} = 2D^2(1+\cos(\omega)) \qquad \text{EQ. (1.9)}$$

and the change in intensity due to an incremental phase shift $\Delta\phi$ is $$\Delta I_{out_{MZI}} = -2D^2(\sin(\psi))\Delta\emptyset \qquad \text{EQ. (1.10)}$$

leading to a sensitivity of $$S_{MZI} = \left| \frac{-\sin(\psi)}{1+\cos(\psi)} \Delta\phi \right| \qquad \text{EQ. (1.11)}$$

Comparing the expressions for the PAI and conventional MZI sensitivities, one obtains:

$$|S_{PAI}| = G|S_{MZI}| \qquad \text{EQ. (1.12)}$$

namely that the sensitivity of the PAI of the present embodiments is enhanced by a factor G as compared to a conventional MZI. As will now be shown, this feature can be utilized to enhance the immunity of the PAI interferometer to RIN, phase noise and other effects.

In interferometry, a significant source of noise is the light source, which exhibits intensity fluctuations known as RIN. Another noise source is laser phase noise, such as in the conversion of phase noise to intensity noise. The dynamic range of two-beam interferometers can be limited by random phase fluctuations of the optical source emission field. Therefore, the total RIN accounts for the direct relative intensity noise as well as the phase-to-intensity noise conversion. In an ideal balanced MZI the phase noise does not degrade the system performance. But for an unbalanced MZI the interferometric delay and biasing point have strong effects on the total RIN measured at the output of the unbalanced MZI.

The variance due to total RIN can be expressed as $$\sigma_{RIN}^2 = I_{out} r_{RIN} \qquad \text{EQ. (1.13)}$$

where $r_{RIN}$ is the relative noise level of the incident optical signal. The signal detection condition due to total RIN limited operation is $$|\Delta I_{out_{PAI}}| \geq I_{out} R_{IN} \qquad \text{EQ. (1.14)}$$

From EQs. 1.6 and 1.7 this gives the minimum detectable phase-change in the presence of RIN $$\Delta\phi_{min_{PAI}} = \frac{1}{G} r_{RIN} \frac{(1+\cos\psi)}{\sin\psi} \qquad \text{EQ. (1.15)}$$

This result can be compared with the minimum detectable phase-change of a conventional MZI. From EQs. 1.9, 1.10 and 1.13

$$\Delta\phi_{min_{MZI}} = r_{RIN} \frac{(1+\cos\psi)}{\sin\psi} \qquad \text{EQ. (1.16)}$$

Comparing these last two expressions, one sees that the minimum detectable phase-change of the PAI of the present embodiments in the presence of RIN is a factor of G smaller than that of a conventional MZI:

$$\Delta\phi_{min_{PAI}} = \frac{1}{G} \Delta\phi_{min_{MZI}} \qquad \text{EQ. (1.17)}$$

Another distortion is due to a nonlinear response of the detection system. The nonlinearity of the detector and the ADC adds a current distortion component. The dependence of the distortion component on the optical power is nonlinear. Assuming that the distortion is proportional to the nth power of $I_{out}$, the detector standard deviation current due to this effect is $$\sigma_D = \beta(RI_{out})^n \qquad \text{EQ. (1.18)}$$

where $\beta$ is a proportionality constant, R is the responsivity of the detector and $\beta(I_{out})^n$ is a small component of the total detector current. The signal detection condition is then)

$$|R\Delta I_{out_{PAI}}| \geq \beta(RI_{out_{PAI}})^n \qquad \text{EQ. (1.19)}$$

The minimum detectable phase-change due to the nonlinearity can be obtained using EQs. 1.6 and 1.7:

$$\Delta\phi_{min_{PAI}} = \frac{2^{(n-1)} R^{(n-1)} D^{2(n-1)}}{G^{2n-1}} \beta \frac{(1+\cos\psi)^n}{\sin\psi} \qquad \text{EQ. (1.20)}$$

This result can be compared to minimum detectable phase-change of a conventional MZI. Using EQs. 1.9, 1.10 and 1.18 one obtains:

$$\Delta\phi_{min_{MZI}} = 2^{(n-1)} R^{(n-1)} D^{2(n-1)} \beta \frac{(1+\cos\psi)^n}{\sin\psi} \qquad \text{EQ. (1.21)}$$

EQs. 1.20 and 1.21 demonstrate that the minimum detectable phase-change of the PAI of the present embodiments due to detector and ADC nonlinearity is smaller by a factor of $G^{2n-1}$ than that of a conventional MZI Mathematically, this can be written as:

$$\Delta\phi_{min_{PAI}} = \frac{1}{G^{2n-1}} \Delta\phi_{min_{MZI}} \qquad \text{EQ. (1.22)}$$

Another consideration relates to the quantization error of the ADC. The standard deviation of the output current due to ADC quantization error is proportional to the ADC full-scale output current. Hence, the standard deviation is proportional to the maximum incident optical power $$\sigma_Q = \frac{1}{k} RI_{out\,max} \qquad \text{EQ. (1.23)}$$

The parameter k in EQ. 1.23 is the square root of the required $SNR_{MAX}$ at the output of the ADC. The detection condition due to quantization error is $$|R\Delta I_{out_{PAI}}| \geq \frac{1}{k} RI_{out\ max_{PAI}} \qquad \text{EQ. (1.24)}$$

From EQ. 1.6, it follows that $I_{out\ max_{PAI}}=4B^2$, and the minimum detectable phase-change due to the quantization error of the ADC can be obtained using EQs. 1.6 and 1.7:

$$\Delta\phi_{min_{PAI}} = \frac{1}{G} \frac{2}{k\sin\Psi} \qquad \text{EQ. (1.25)}$$

The minimum detectable phase-change of a conventional MZI can be obtained from EQs. 1.9, 1.10 and 1.23:

$$\Delta\phi_{min_{MZI}} = \frac{2}{k\sin\Psi} \qquad \text{EQ. (1.26)}$$

EQs. 1.25 and 1.26 demonstrate that in the presence of quantization noise, the minimum detectable phase shift of the PAI of the present embodiments is smaller by a factor of G than that of a conventional MZI:

$$\Delta\phi_{min_{PAI}} = \frac{1}{G}\Delta\phi_{min_{MZI}} \qquad \text{EQ. (1.27)}$$

In many practical applications, the combined effects of the total RIN, distortion noise and quantization error are significantly larger than the shot noise. Reducing the effect of these noise sources allows for operation close to the shot-noise limit. In the following discussion, it is assumed that the thermal noise is negligible, which is the usual desired situation in interferometry.

At the shot-noise limit, the phase sensitivity $\Delta\phi_{min}$ of a conventional MZI is inversely proportional to the square root of N, where N is the mean photon number of the radiation, obeying Poisson statistics. For such a distribution, the output variance of a conventional MZI in a bandwidth $\Delta f$ is given by the shot noise formula:

$$\sigma_S^2 = \sqrt{2h\upsilon I_{out}(\omega)\Delta f} = \sqrt{4h\upsilon D^2(1+\cos\psi)\Delta f} \qquad \text{EQ. (1.28)}$$

Therefore, for a shot-noise limited interferometer, the signal detection condition is $$|\Delta I_{out}| \geq \sigma_S^2 = \sqrt{2h\upsilon I_{out}\Delta f} \qquad \text{EQ. (1.29)}$$

At this limit, the relevant sensitivity parameter is defined as $$S_{shot} \equiv \frac{|\Delta I_{out}(\psi)|}{\sqrt{I_{out}(\psi)}} \qquad \text{EQ. (1.30)}$$

The sensitivity of a standard shot-noise limited conventional MZI can be obtained using EQs. 1.9 and 1.10:

$$S_{shot_{MZI}} = 2D\Delta\phi \sin\frac{\psi}{2} \qquad \text{EQ. (1.31)}$$

The sensitivity of the PAI of the present embodiments can be obtained using EQs. 1.6 and 1.7:

$$S_{shot_{PAI}} = 2BG\Delta\phi \sin\frac{\psi}{2} = 2D\Delta\phi \sin\frac{\psi}{2} \qquad \text{EQ. (1.32)}$$

which is the same as sensitivity of a standard shot-noise limited conventional MZI:

$$S_{shot_{PAI}} = S_{shot_{MZI}} \qquad \text{EQ. (1.33)}$$

A number of possible mechanisms exist for further improving the sensitivity of interferometry beyond the shot-noise limit. Mostly, attention was focused on methods for achieving the Heisenberg limit of $\Delta\phi_{min} \propto 1/N$ by driving the interferometer with nonclassical states of light [Z. Y. Ou, "Fundamental quantum limit in precision phase measurement", Phys. Rev. A 55, 2598 (1997)]. Other methods are based on a multi-path interferometer, where a coherent input signal is split into many beams by a 2M-port multisplitter [Giacomo M. D'Ariano and Matteo G. A. Paris, "Arbitrary precision in multipath interferometry", Phys. Rev. A 55, 2267 (1997); Gregor Weihs, Michael Reck, Harald Weinfurter, and Anton Zeilinger, "All-fiber three-path Mach-Zehnder interferometer," Opt. Lett. 21, 302-304 (1996); J. Chwedenczuk, F. Piazza and A. Smerzi, "Multipath interferometer with ultracold atoms trapped in an optical lattice", Phys. Rev. A 87, 033607 (2013)]. After eliminating all other noise effects with PAI, these technologies can be integrated into the PAI of the present embodiments to approach the Heisenberg-limited sensitivity.

Experimental

Figure 8:
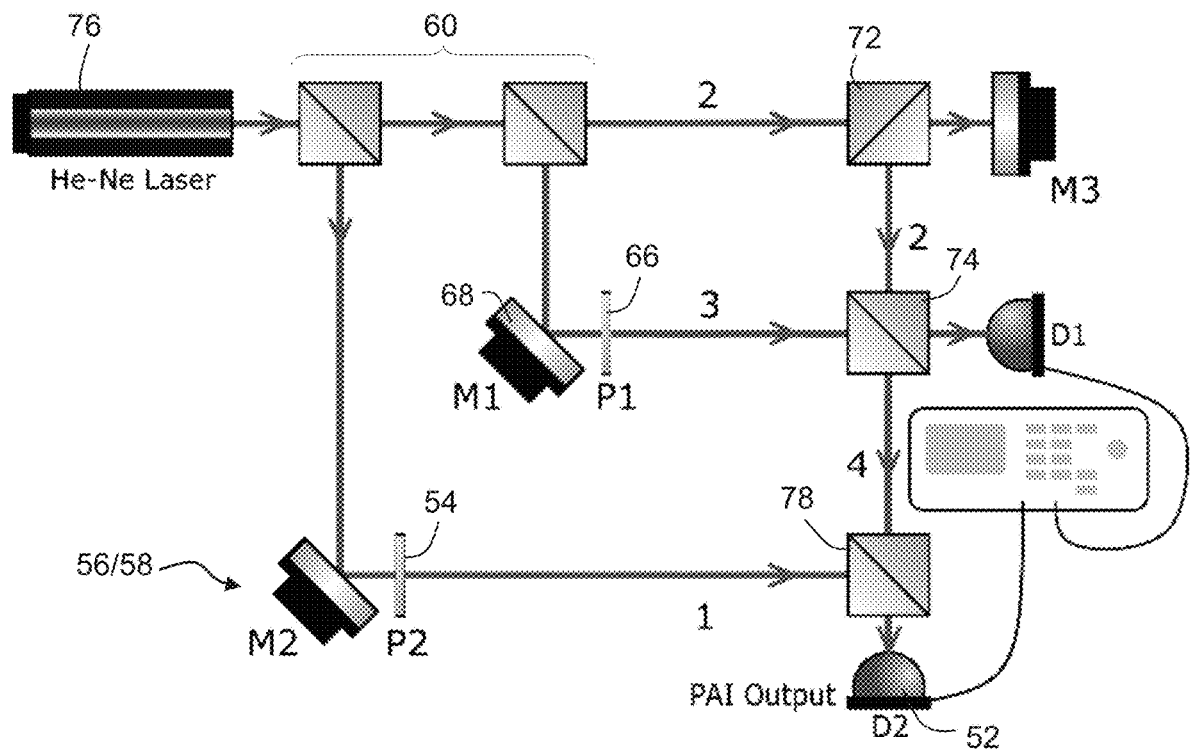
FIG. 8 is a schematic illustration of an experimental setup used for studying a homodyne phase-shift amplified interferometer according to some embodiments of the present invention.

FIG. 8 is a schematic illustration of an experimental setup used for studying the PAI of the present embodiments. A stabilized He—Ne laser was used for illumination. The inner MZI consisted of beams 2 (the signal beam which probes the moving mirror M3) and 3 (reference), the output of which (beam 4) interfered with beam 1, the reference of the outer MZI. The amplitudes and phases of beams 3 were controlled with polarizers P1 and piezo-activated mirror stage M1 respectively, and those of beam 1 were controlled with polarizer P2 and stage M2 respectively. The position of mirror M3, was controlled with a piezo-stage to form the desired phase-shift $\Delta\phi$.

Initially, the inner MZI was set to be in anti-phase at its output, and monitored with detector D1 together with a feedback loop to stabilize the output power to the minimum point (destructive interference). In addition, polarizer P1 was set so that the intensity of beam 3 was smaller than that of beam 2 by a factor $(1-\Delta A/A)^2$.

Polarizer P2 was set to equalize the power of beam 1 to that of beam 4. Mirror stage M2 was set so that the phase difference between beams 4 and 1 was in the range of $\pi/2$, as monitored with detector D2. The position of M3 was changed in steps $\Delta x$, which added a round-trip incremental phase shift $\Delta\phi = 2\pi\Delta x/\lambda$, and the PAI output at D2 was monitored. The resolution $\Delta x$ of the piezo stage M3 was about 0.65 nm, giving an incremental phase shift $\Delta\phi$ of about 0.0129 radians. Initially, a $\pi/2$ phase difference between beams 4 and 1 was formed before shifting the stage M3, and initial output power $I_{out}(\Delta\phi=0)$ was measured. After shifting stage M3, the output power $I_{out}(\Delta\psi_{PAI})$ was again monitored. The relation between the output powers at $\Delta\phi=0$ and $\Delta\psi_{PAI}$ is:

$$I_{out}(\Delta\psi_{PAI}) = I_{out}(\Delta\phi = 0)\left[1 + \cos\left(\frac{\pi}{2} + \Delta\psi_{PAI}\right)\right] \quad \text{EQ. (1.34)}$$

The output amplified phase-shift $\Delta\psi_{PAI}$ can be determined from the measured powers $I_{out}(\Delta\psi_{PAI})$ and $I_{out}(\Delta\phi=0)$, as follows:

$$\Delta\psi_{PAI} = \sin^{-1}\left(1 - \frac{I_{out}(\Delta\psi_{PAI})}{I_{out}(\Delta\phi = 0)}\right) \quad \text{EQ. (1.35)}$$

Figure 9:
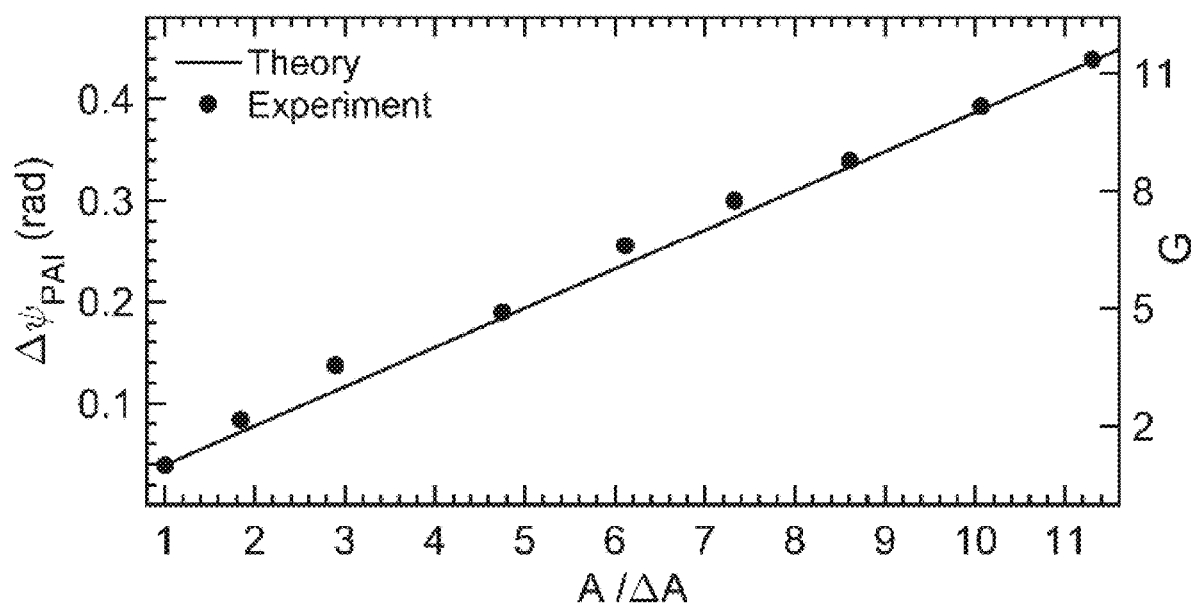
FIG. 9 shows measured amplified phase-shift in radians (left ordinate) and a corresponding achieved amplification (right ordinate), as obtained in experiments performed using a homodyne phase-shift amplified interferometer according to some embodiments of the present invention.

FIG. 9 shows the measured amplified phase-shift in radians (left axis) and the corresponding achieved amplification G (right axis) for various values of A/ΔA. The applied phase shift Δϕ was 0.0387 radians, which is about 3 times the stage resolution. Also shown in FIG. 9 is prediction of EQs. 1.3 and 1.4. As shown, the experimental results of $\Delta\psi_{PAI}$ (using EQ. 1.35) and G are in good agreement with the theoretical prediction (using EQ. 1.3 and 1.4). A phase-shift amplification factor of up to more than 11 is demonstrated.

This Example demonstrates that the PAI of the present embodiments improves the sensitivity of the interferometer. PAI improves the resolution of conventional optical interferometers by an order of magnitude or more. This was borne out in an experiment, where a sensitivity amplification factor of more than 11 was achieved. This Example demonstrates that the PAI of the present embodiments is useful for overcoming direct RIN, as well as the RIN caused by phase-to-intensity noise conversion. In addition, the PAI of the present embodiments improves the immunity of the system against nonlinear and distortion effects of the detector and the ADC, as well as ADC quantization error. Specifically, the effects of the RIN as well as ADC quantization noise were found to be reduced by a factor of G, and the effect of the detector and post-detection nonlinearity was found to be reduced by $G^{2n-1}$, where n is a power of the output intensity to which a distortion due to the nonlinear response of the detection system is proportional. Reducing the effect of these noise sources and distortions allows for operation close to the shot-noise limit. The PAI of the present embodiments can be integrated with further shot noise reduction technologies, such as, but not limited to, squeezed states of light and multi-path interferometry to approach the Heisenberg limit.

Example 2

Heterodyne Phase-Shift Amplified Interferometry

This Example demonstrates a technique for improving the sensitivity of an heterodyne interferometer, according to some embodiments of the present invention. The technique is referred to in this Example as heterodyne PAI, and is based on two embedded interferometers operating in different optical frequencies. An inner interferometer is operating in an optical frequency $\omega_1$, and is biased in anti-phase, and an outer interferometer is operating in an optical frequency $\omega_2 \neq \omega_1$.

Design Considerations

Figure 10:
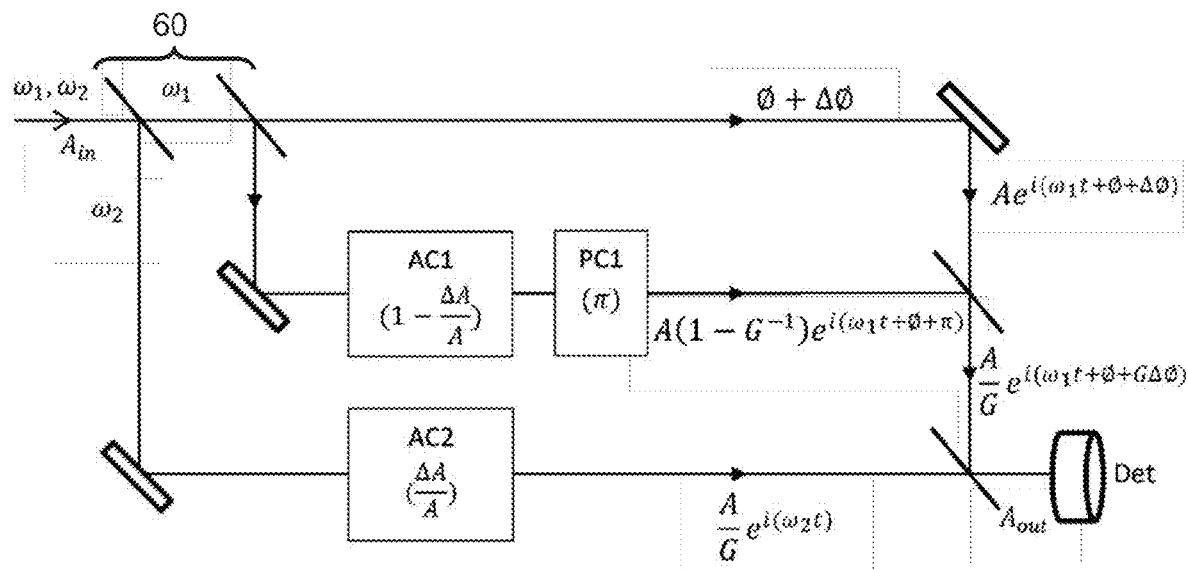
FIG. 10 is a schematic illustration of a design of a heterodyne phase-shift amplified interferometer designed for experiments performed according to some embodiments of the present invention.

A schematic of the heterodyne PAI interferometer used in this Example according to some embodiments of the present invention is shown in FIG. 10.

Each interferometer was operated with a separate optical frequency. The upper two arms formed the inner MZI with light of frequency $\omega_1$, where the small phase-shift ΔØ to be monitored was formed on its signal arm. The purpose of the inner MZI was to amplify the phase-shift ΔØ. The output of the inner MZI then underwent further interference with the bottom arm with frequency $\omega_2$ to form the outer MZI, whose purpose was to create a beat signal of frequency $\omega_2-\omega_1$ after the detector (Det). The inner MZI contained both amplitude and phase controllers (AC1, PC1 respectively), while the outer MZI contained an amplitude controller (AC2), to properly bias the system, as explained below.

A description of the operation of the outer MZI is preceded by a description of the operation of the inner MZI.

The reference arm of the inner MZI was phase-biased with the aid of PC1 so that the signal and reference were close to π out of phase (it is assumed that the incremental phase shift ΔØ<<1 so that it does not change this situation) and the amplitude of the reference arm was slightly offset from that of the signal amplitude A by a factor of 1−ΔA/A, ΔA being the difference in amplitude between the signal and reference arms. Summing the signal and reference leads to $$Ae^{i(\omega_1 t+\phi+\Delta\phi)} + A\left(1 - \frac{\Delta A}{A}\right)e^{i(\omega_1 t+\phi+\pi)} = Be^{i(\omega_1 t+\psi)}, \quad \text{(EQ. 2.1)}$$

where the output amplitude B and the output phase ψ are:

$$B = A\left(1 + 2\left(\frac{\Delta A}{A} - 1\right)\cos(\Delta\phi) + \left(1 - \frac{\Delta A}{A}\right)^2\right)^{\frac{1}{2}}, \quad \text{(EQ. 2.2)}$$

$$\psi = \phi + \Delta\psi = \phi + tn^{-1}\left(\frac{\left(\frac{\Delta A}{A} - 1\right)\sin(\Delta\phi)}{1 + \left(\frac{\Delta A}{A} - 1\right)\cos(\Delta\phi)}\right). \quad \text{(EQ. 2.3)}$$

The phase amplification was defined as $$G \equiv \frac{\Delta\psi}{\Delta\phi}. \quad \text{(EQ. 2.4)}$$

For ΔØ<<1 G≈A/ΔA, so that:

$$B \approx A/G, \quad \text{(EQ. 2.5a)}$$

and $$\psi = \phi + G\Delta\phi. \quad \text{(EQ. 2.5b)}$$

Thus, the inner MZI ensured that small phase shift was amplified by a factor of G, and the output amplitude was reduced by the same factor G.

The output of the inner MZI interfered with an additional light beam, whose amplitude and optical frequency were set to B and $\omega_2$, respectively, so that the final output intensity was an AC signal with a beat frequency $\Delta\omega=\omega_1-\omega_2$:

$$I_{out_{PAI}}^{AC} = |A_{OUT_{PAI}}^{AC}|^2 = B^2 \cos(\Delta\omega t+\psi). \quad \text{(EQ. 2.6)}$$

The present invent found that as compared to a conventional heterodyne Mach-Zehnder interferometer, the heterodyne PAI interferometer of the present embodiments is fundamentally more sensitive at the shot-noise limit. The improved sensitivity is at least a factor of $\sqrt{2}$.

Experimental

Figure 11:
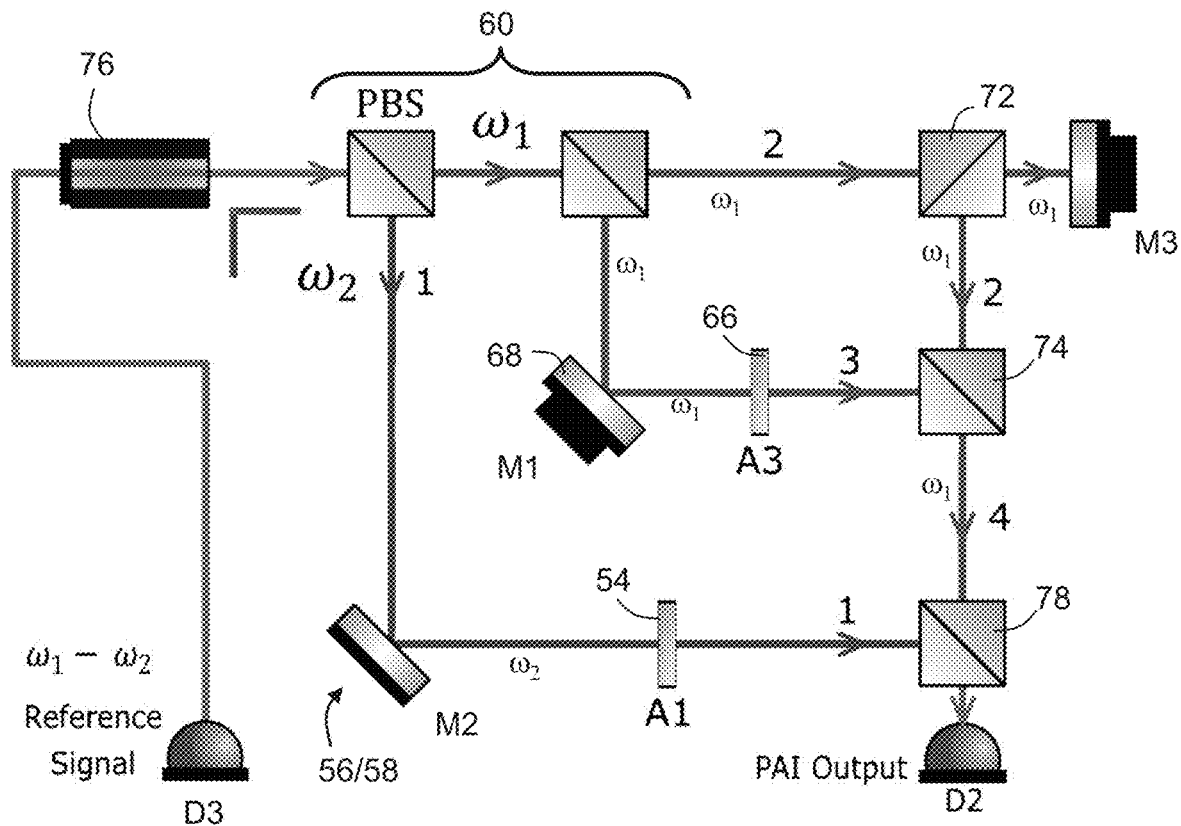
FIG. 11 is a schematic illustration of an experimental setup used for studying a heterodyne phase-shift amplified interferometer according to some embodiments of the present invention.

FIG. 11 is a schematic illustration of an experimental setup used for studying the heterodyne PAI of the present embodiments. A dual-wavelength He—Ne laser source with a total power of 1.6 mW (ZYGO 7712) was used as the wave generating system 76. The laser's built-in reference output beam was detected with detector D3 and provided an AC signal with a frequency of 20 MHz. The output wavelengths were orthogonally polarized and were split at a first polarizing beam splitter (PBS) into a reference arm which formed the outer MZI with frequency $\omega_2$ and a signal arm that formed the inner MZI with frequency $\omega_1$. The inner MZI consisted of beams 2 (the signal beam which probed moving mirror M3) and 3 (reference beam for inner MZI), the output of which (beam 4) interfered with beam 1 (reference beam of the outer MZI). The amplitude and phase of beam 3 were controlled with a variable attenuator A3 and piezo-activated mirror stage M1 with a resolution of 0.2 nm respectively. Beam 1 was redirected by a mirror M2 to a variable attenuator A1 for controlling its amplitude. The position of mirror M3, also controlled with a piezo-stage, was shifted to form the desired phase-shift $\Delta\phi$.

Initially, the inner MZI was set to be in anti-phase at its output together with an electronic feedback loop that was implemented at mirror M3 to reduce sensitivity to mechanical vibrations or temperature drifts. In addition, the attenuator A3 was set so that the intensity of beam 3 was smaller than that of beam 2 by a factor $(1-\Delta A/A)^2$.

At the outer MZI, attenuator A1 was set to attenuate the power of beam 1 to be on the same order of magnitude as the output of the inner MZI (beam 4). For heterodyne detection, a complete equalization is not strictly necessary. The position of M3 was changed in steps $\Delta x$, which added a round-trip incremental phase shift $\Delta\phi = 2 \cdot 2\pi/\lambda \Delta x$, and the PAI output was monitored at detector D2. The resolution of the piezo stage M3 was $\Delta x_{res}=0.7$ nm, giving phase shift resolution $\Delta\phi_{res}=0.014$ rad. An initial phase-shift $I_{outPAI}$ $(\Delta\psi_{PAI}=0)=I_{outPAI}\cos(\Delta\omega t+\psi_{PAI})$ between the general reference signal and the beat signal at the output of the heterodyne PAI was measured, then a phase shift $\Delta\phi$ was applied at the shifting stage M3 and the phase-shift of the beat signal was again measured $$I_{outPAI}(\Delta\psi_{PAI})=I_{outPAI}\cos(\Delta\omega t+\psi_{PAI}+\Delta\psi_{PAI}). \qquad (EQ.\ 2.7)$$

Figure 12:
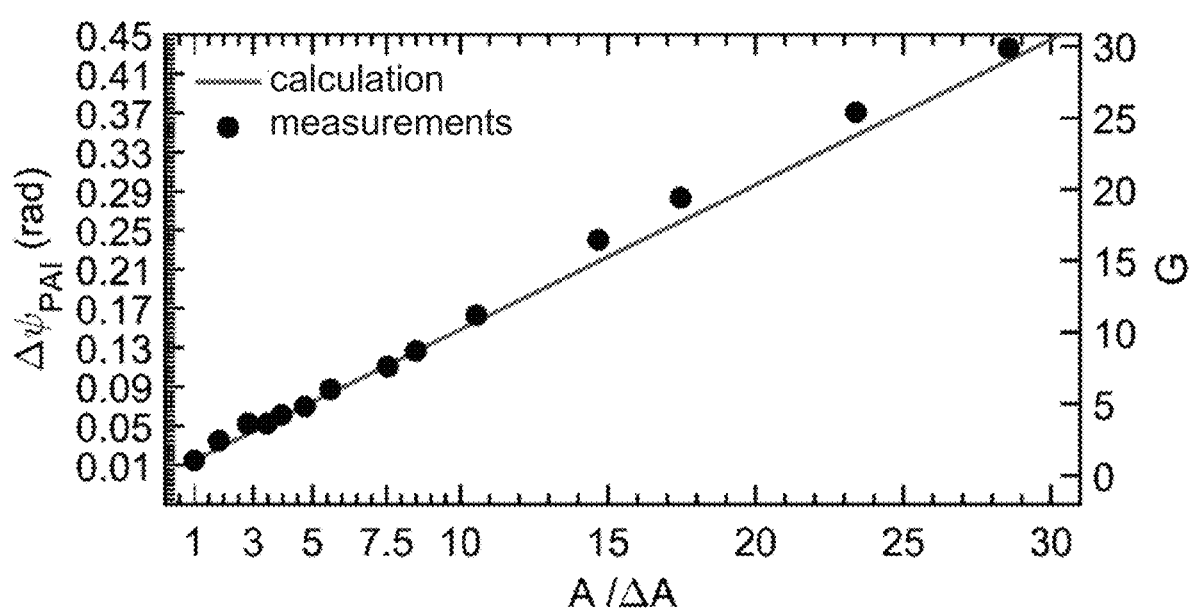
FIG. 12 shows measured amplified phase-shift in radians (left ordinate) and a corresponding achieved amplification (right heterodyne phase-shift amplified interferometer), as obtained in experiments performed using a heterodyne phase-shift amplified interferometer according to some embodiments of the present invention.

FIG. 12 shows measured amplified phase-shift (left ordinate) and the corresponding achieved amplification $G\equiv\Delta\psi/(\Delta\emptyset)$ (right ordinate) for various values of $A/\Delta A$ (abscissa). The values of G and $\Delta\psi$ as calculated according to EQs. 2.3 and 2.4 are also shown. Measured values are shown as full circles, and calculations are shown as a solid line.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

REFERENCES

[1] K. Petewann and E. Weidel, "Semiconductor Laser Noise in an Interferometer System", IEEE J. Quant. Electron. QE-17, 1251 (1981).
[2] Mohammad Reza Salehi and Béatrice Cabon, "Theoretical and Experimental Analysis of Influence of Phase-to-Intensity Noise Conversion in Interferometric Systems," J. Lightwave Technol. 22, 1510-(2004).
[3] B. Moslehi, "Noise power spectra of optical two-beam interferometers induced by the laser phase noise," J. Lightwave Technol. 22, 1704-1710 (1986).
[4] Moshe Ben Ayun, Arye Schwarzbaum, Seva Rosenberg, Monika Pinchas, and Shmuel Sternklar, "Photonic radio frequency phase-shift amplification by radio frequency interferometry," Opt. Lett. 40, 4863-4866 (2015).
[5] Moshe Ben Ayun, Seva Rosenberg, Daniel Gotliv, and Shmuel Sternklar, "Fundamental Limits of Photonic RF Phase-Shift Amplification by RF Interferometry," J. Lightwave Technol. 35, 1906-1913 (2017).
[6] G. P. Agrawal, Fiber-Optic Communication Systems, 4th ed. (John Wiley and Sons, 2011).
[7] Ariel Luzzato, Motti Haridim, Wireless Transceiver Design, Second Edition. (John Wiley & Sons, 2016).
[8] Z. Y. Ou, "Fundamental quantum limit in precision phase measurement", Phys. Rev. A 55, 2598 (1997).
[9] Giacomo M. D'Ariano and Matteo G. A. Paris, "Arbitrary precision in multipath interferometry", Phys. Rev. A 55, 2267 (1997).
[10] Gregor Weihs, Michael Reck, Harald Weinfurter, and Anton Zeilinger, "All-fiber three-path Mach-Zehnder interferometer," Opt. Lett. 21, 302-304 (1996).
[11] J. Chwedenczuk, F. Piazza and A. Smerzi, "Multipath interferometer with ultracold atoms trapped in an optical lattice", Phys. Rev. A 87, 033607 (2013).
[12] Chris P. Brophy, "Effect of intensity error correlation on the computed phase of phase-shifting interferometry," J. Opt. Soc. Am. A 7, 537-541 (1990).

What is claimed is:
1. An interferometer system, comprising:
a sample interferometer arm for guiding a first wave to a sample, and receiving a reflected wave from said sample;
a phase amplifier for amplifying a phase shift of said reflected wave, to provide a phase-shift-amplified intermediate wave;
an additional interferometer arm for guiding an additional wave to combine with said phase-shift-amplified intermediate wave, to provide an output wave; and
a detector for detecting said output wave;
wherein said phase amplifier comprises:
a wave splitter system for receiving an input wave and providing said first wave and a second wave;
an amplitude controller for controlling amplitude of at least one of said first and said second waves, such that amplitudes of said waves satisfy the relation $A_1/\Delta A=G$ or the relation $A_2/\Delta A=G$, wherein $A_1$ and $A_2$ are the amplitudes of said first and said second waves, respectively, $\Delta A$ is defined as $|A_1-31\ A_2|$ and G is a predetermined phase amplification factor;
a phase controller for maintaining a phase shift of about $\pi$ radians between said first and said second waves; and a wave combiner for combining said sample and said second waves.

2. The system according to claim 1, wherein said phase-shift-amplified intermediate wave and said additional wave have the same optical frequency.

3. The system according to claim 1, wherein said phase-shift-amplified intermediate wave and said additional wave have different optical frequencies.

4. The system according to claim 1, comprising at least one amplitude controller configured to ensure that said phase-shift-amplified intermediate wave and said additional wave are of approximately the same intensities.

5. The system according to claim 1, wherein said phase-shift amplifier comprises an amplitude controller configured to ensure that an amplitude of said phase-shift-amplified intermediate wave differs from an amplitude of said reflected wave.

6. The system according to claim 1, comprising an optical amplifier configured for amplifying said phase-shift-amplified intermediate wave.

7. The system according to claim 1, further comprising a scanning stage configured for varying an optical length of at least one of said arms.

8. The system according to claim 1, wherein said arms are arranged as one of: Michelson interferometer arms, Mach-Zehnder interferometer arms, Sagnac interferometer arms, Fabry-Pérot interferometer arms, and Fizeau interferometer arms.

9. A method of interferometry, comprising:
guiding a first wave to a sample;
receiving a reflected wave from said sample;
amplifying a phase shift of said reflected wave, to provide a phase-shift-amplified intermediate wave;
combining an additional wave with said phase-shift-amplified intermediate wave, to provide an output wave; and
analyzing an interference pattern constituted by said output wave;
wherein said amplifying comprises:
receiving an input wave and providing said first wave and a second wave;
controlling amplitude of at least one of said first and said second waves, such that amplitudes of said waves satisfy the relation $A_1/\Delta A = G$ or the relation $A_2/\Delta A = G$, wherein $A_1$ and $A_2$ are the amplitudes of said first and said second waves, respectively, $\Delta A$ is defined as $|A_1 - A_2|$ and G is a predetermined phase amplification factor;
maintaining a phase shift of about $\pi$ radians between said first and said second waves; and
combining said sample and said second waves.

10. The method according to claim 9, wherein said phase-shift-amplified intermediate wave and said additional wave have the same optical frequency.

11. The method according to claim 9, wherein said phase-shift-amplified intermediate wave and said additional wave have different optical frequencies.

12. The method according to claim 9, further comprising changing amplitude of at least one of said phase-shift-amplified intermediate wave and said additional wave to ensure that said phase-shift-amplified intermediate wave and said additional wave are of approximately the same intensities.

13. The method according to claim 9, further comprising changing amplitude of at least one of said phase-shift-amplified intermediate wave and said reflected wave to ensure that said amplitudes of said phase-shift- amplified intermediate wave and said reflected wave differ.

14. The method according to claim 9, further comprising generating an input wave to be coupled into said interferometer arms and providing said first wave and said additional wave by splitting said input wave.

15. The method according to claim 9, comprising an optical amplifier configured for amplifying said phase-shift-amplified intermediate wave.

16. The method according to claim 9, further comprising varying an optical length of at least one of said arms.

17. The method according to claim 9, comprising amplifying a phase shift of said output wave.

18. The method according to claim 9, comprising converting said output wave to an output electrical signal by a wave detector and amplifying a phase shift of said output electrical signal.

* * * * *